(12) United States Patent  (10) Patent No.: US 7,610,352 B2
AlHusseini et al.  (45) Date of Patent: Oct. 27, 2009

(54) SHARING SKINS

(75) Inventors: Ibrahim Ameen AlHusseini, Santa Monica, CA (US); Bruce Klickstein, Redding, CA (US); Robert P. Lipschultz, Redding, CA (US); Gregg D. Harrington, Redding, CA (US)

(73) Assignee: MECA Communications, Inc., San Luis Obispo, CA (US)

( * ) Notice: Subject to any disclaimer, the term of this patent is extended or adjusted under 35 U.S.C. 154(b) by 709 days.

(21) Appl. No.: 10/238,389

(22) Filed: Sep. 9, 2002

(65) Prior Publication Data
US 2007/0033254 A1 Feb. 8, 2007
US 2007/0203984 A2 Aug. 30, 2007

(51) Int. Cl.
G06F 15/16 (2006.01)
(52) U.S. Cl. ............... 709/217; 709/204; 709/205; 715/744; 715/751; 715/758
(58) Field of Classification Search ........... 709/203, 709/205, 217–219, 204, 206, 243, 244; 715/758
See application file for complete search history.

(56) References Cited

U.S. PATENT DOCUMENTS

| 5,905,492 | A  | * | 5/1999 | Straub et al. | 715/744 |
|---|---|---|---|---|---|
| 6,091,411 | A  | * | 7/2000 | Straub et al. | 715/747 |
| 6,301,609 | B1 |   | 10/2001 | Aravamudan et al. | |
| 6,487,583 | B1 | * | 11/2002 | Harvey et al. | 709/203 |
| 6,539,421 | B1 | * | 3/2003 | Appelman et al. | 709/206 |
| 6,654,032 | B1 | * | 11/2003 | Zhu et al. | 709/205 |
| 6,687,745 | B1 | * | 2/2004 | Franco et al. | 709/219 |
| 6,731,310 | B2 | * | 5/2004 | Craycroft et al. | 715/747 |
| 6,813,775 | B1 | * | 11/2004 | Finseth et al. | 725/46 |
| 6,906,696 | B2 | * | 6/2005 | Allport | 345/156 |
| 6,938,042 | B2 | * | 8/2005 | Aboulhosn et al. | 707/10 |
| 7,093,198 | B1 | * | 8/2006 | Paatero et al. | 715/746 |
| 7,133,900 | B1 | * | 11/2006 | Szeto | 709/206 |
| 2003/0195801 | A1 | * | 10/2003 | Takakura et al. | 705/14 |
| 2004/0100490 | A1 | * | 5/2004 | Boston et al. | 345/744 |

OTHER PUBLICATIONS

Windows Customization 2002, A Primer, Apr. 2002 by Bradley Wardell (12 pages).
The World of "Skinning" an introductory primer!; believed to be published prior to Sep. 2002 (6 pages).

(Continued)

*Primary Examiner*—Ramy Mohamed Osman
(74) *Attorney, Agent, or Firm*—Thomas F. Lebens; Sinsheimer Juhnke Lebens & McIvor, LLP

(57) ABSTRACT

A system and method for sharing skins between a first user and a second user on a computerized network. A first skin selected by the first user is transferred to and displayed to the second user. The transfer and/or the display is performed automatically. A second skin selected by the second user is transferred to and displayed to the first user. In one embodiment, the first and second skins are alternately displayed (e.g. periodically in time) to the first and second users. Users can have one or more skins, including a default skin, associated with each of them. Options are available to allow a user to authorize skin sharing with other users, to specify which skins can be shared, to control the amount of time between alternating skin displays, and the number of times the skins are alternately displayed.

37 Claims, 18 Drawing Sheets

OTHER PUBLICATIONS

Skin Definition —Small Business Computing Online Dictionary of IT Terms; believed to be published prior to Sep. 2002 (4 pages).

Skin (computing) Definition Meaning Information Explanation; believed to be published prior to Sep. 2002 (2 pages).

Writing Skinnable XUL and CSS by David Hyatt; believed to be published prior to May 18, 2002 (5 pages).

How to Make Skins —Sticker —Aversoft; believed to be published prior to May 18, 2002 (3 pages).

VBskinner: Make vb forms skinnable (an opensource project); believed to be published prior to May 18, 2002 (1 page).

* cited by examiner

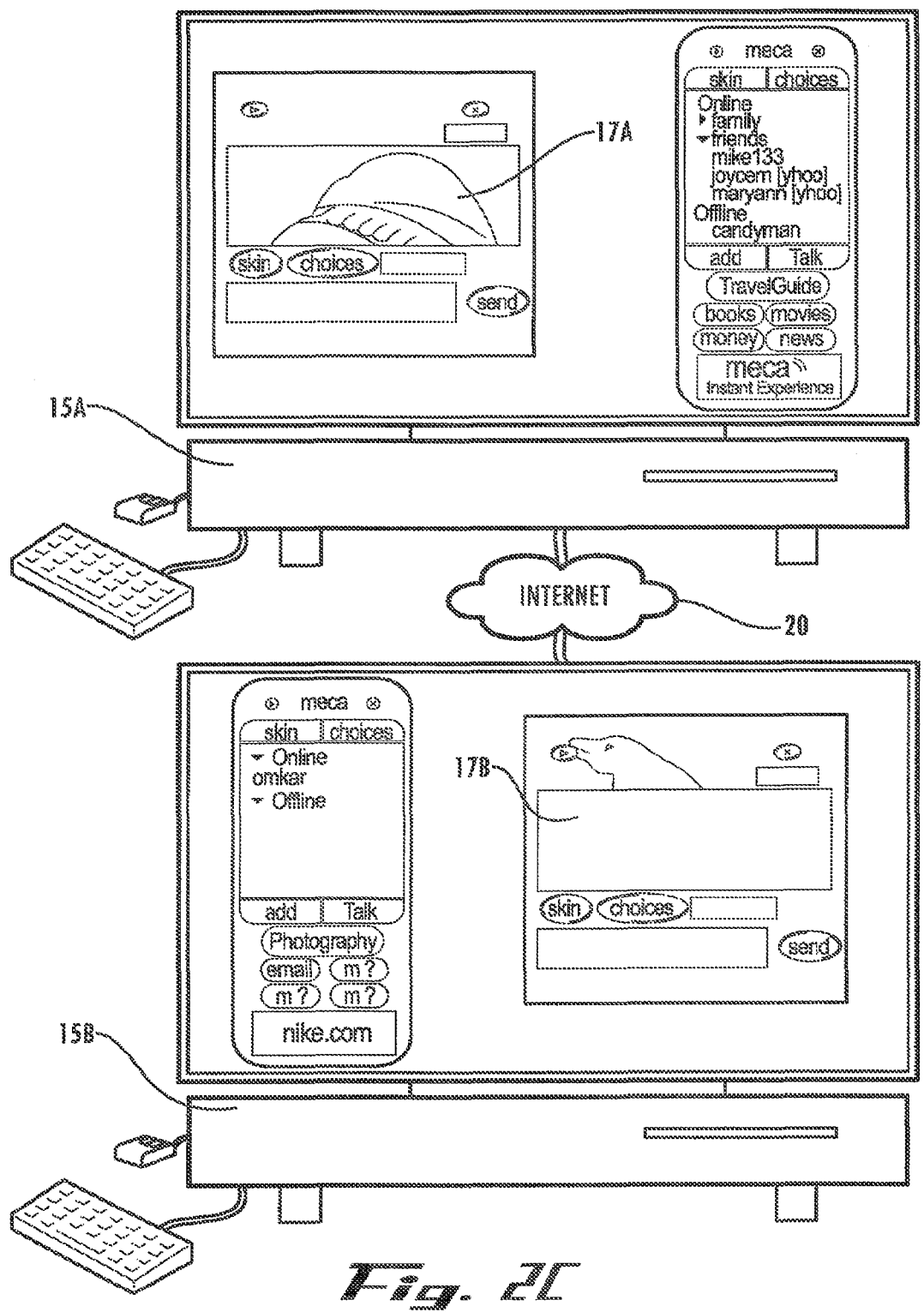

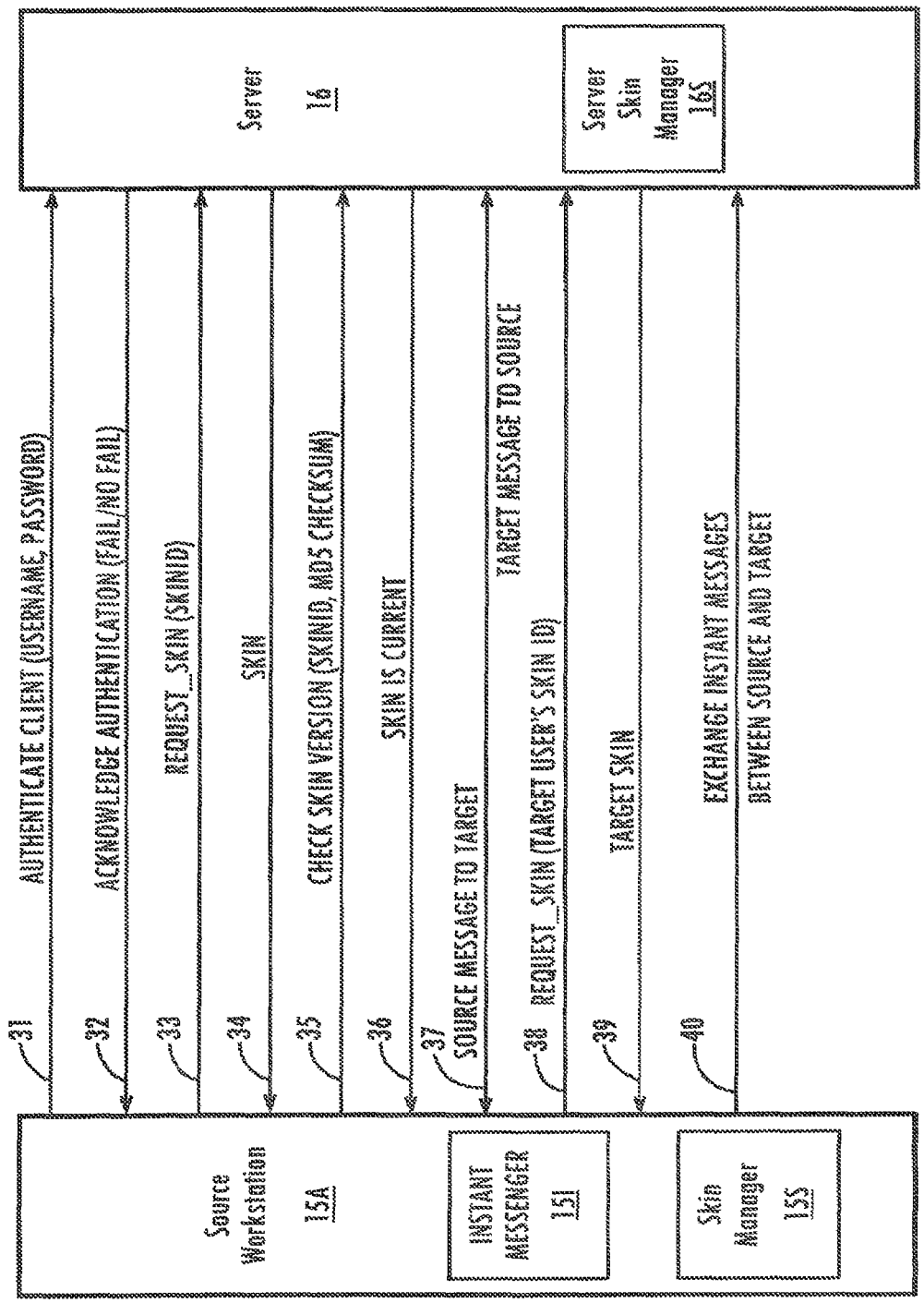

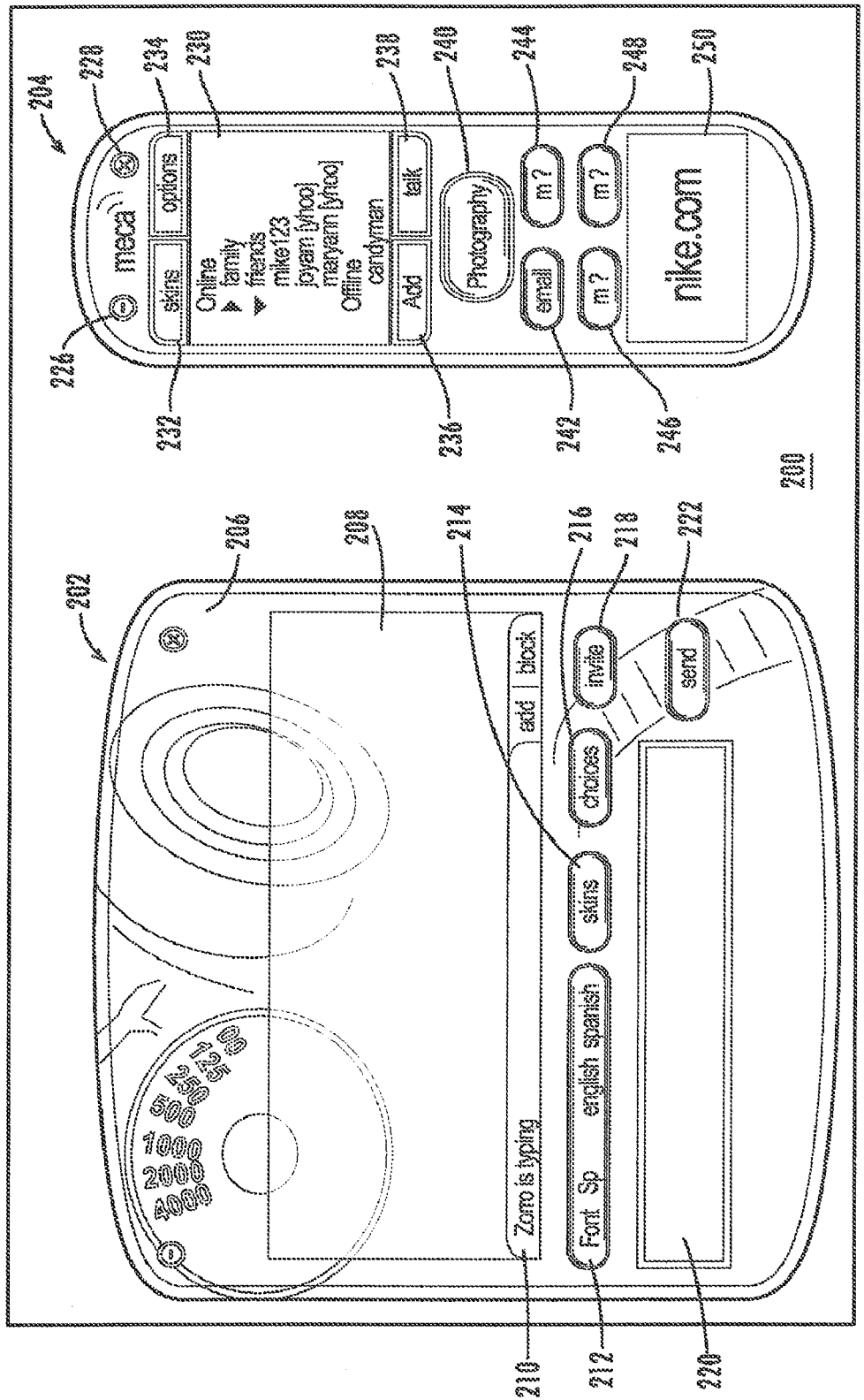

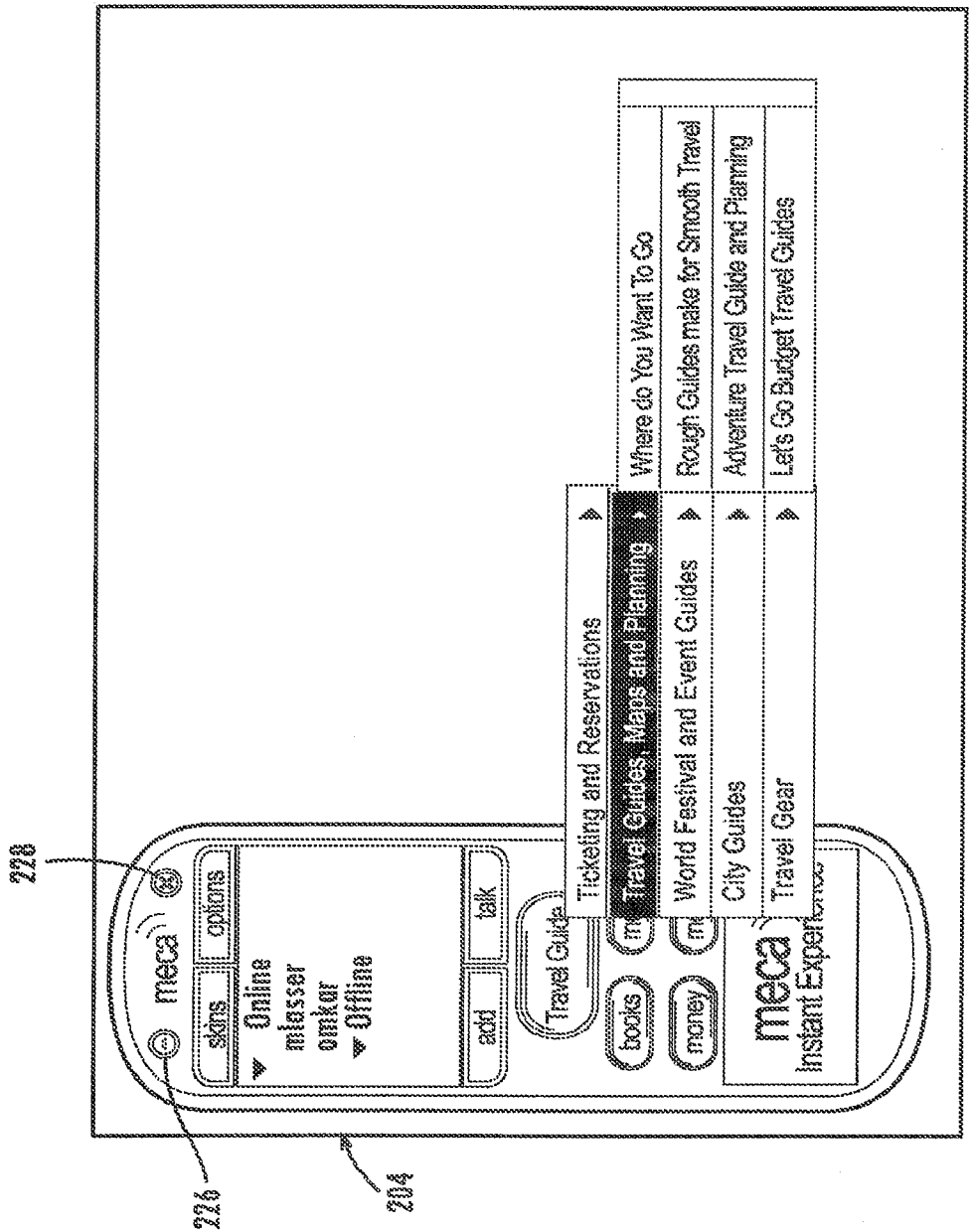

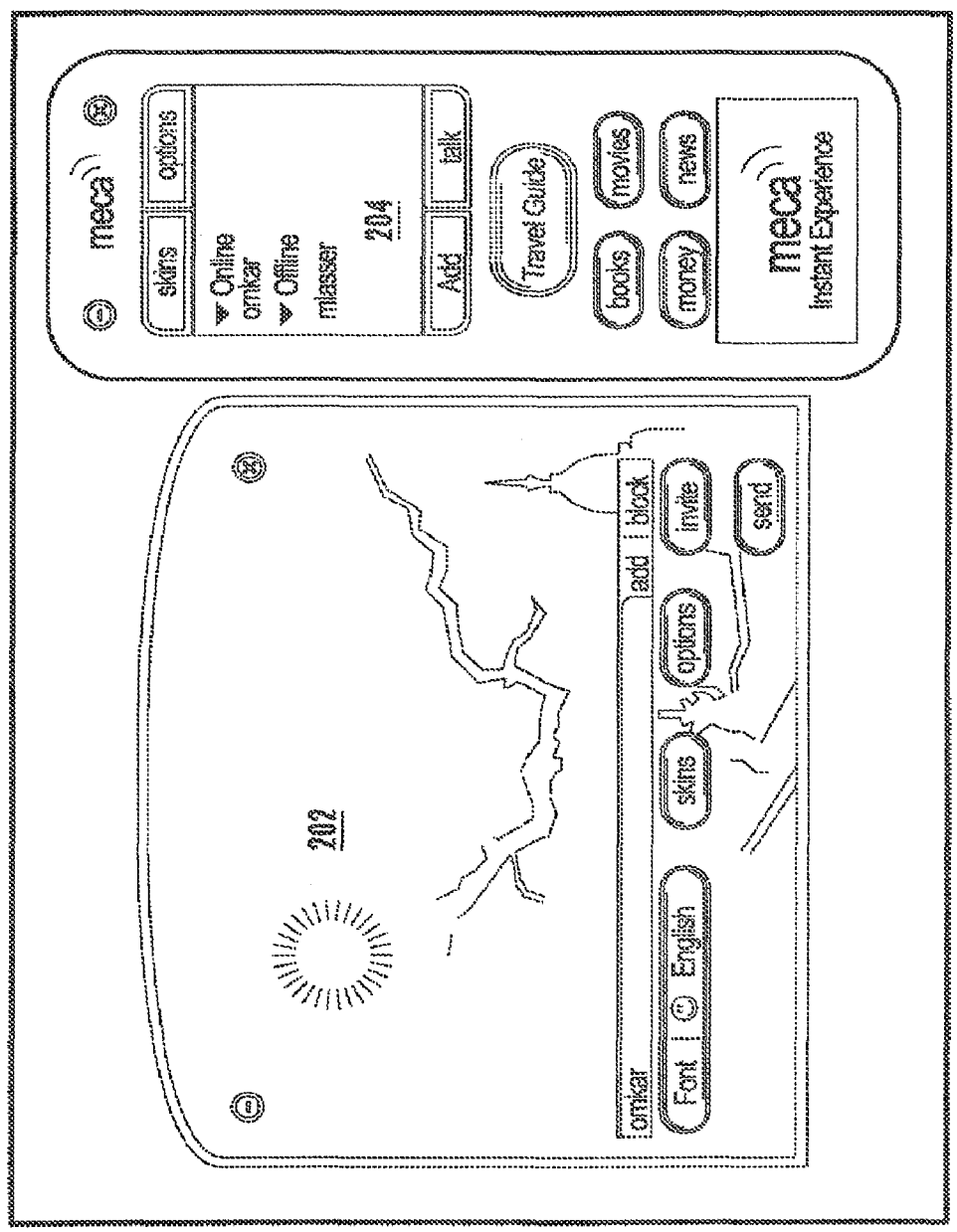

SHARING SKINS

CROSS-REFERENCE TO COMPUTER PROGRAM LISTING APPENDIX

Appendix A contains the following files in one CD-ROM (of which two identical copies are attached hereto), and is a part of the present disclosure and is incorporated by reference herein in its entirety.

Volume in drive D is Sharingskin

Volume Serial Number is 04D1-08B5

```
    Directory of D:\
    09/08/2002 09:21a          43,027 Client1.txt
    09/08/2002 09:21a          13,339 Client2.txt
    09/08/2002 09:21a          76,972 Client3.txt
    09/08/2002 09:21a           4,532 server1.txt
    09/08/2002 09:24a           2,007 server2.txt
    09/08/2002 09:24a           1,969 server3.txt
         6 File(s)      141,846 bytes
         0 Dir(s)             0 bytes free
```

The files of Appendix A form source code of computer programs for an illustrative embodiment of the present invention.

The files client1.txt, client2.txt and client3.txt contain computer instructions in Borland's Delphi 5 for describing the behavior of one embodiment of a workstation that supports skin sharing. Note that instead of using Delphi language software for client computers, other embodiments may use software written in other languages such as C++ or Java.

The files server1.txt, server2.txt and server3.txt are computer instructions in the language Java for describing the behavior of one embodiment of a server that supports client computers programmed with the above-described Delphi software: client1.txt, client2.txt and client3.txt.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

Users at two or more computers (called "workstations") can communicate information between each other using a communication network. One such network includes one or more additional computers (called "servers") that have data storage and routing facilities for transferring information between servers to a workstation. The workstations include network interfaces that allow them to transmit and receive information from the servers. Another commonly used network is a peer-to-peer network that includes a communication link between two or more workstations to communicate information directly between the workstations (without the need for a server).

Workstations connected to a network can include software for allowing users to exchange messages with one another in real-time. This type of exchange is commonly referred to as instant messaging and/or chat session. Instant messaging typically involves two users, whereas chat sessions typically involve more than two users. In both kinds of sessions, messages are entered and received via a user interface on the workstations.

For additional information on instant messaging, see U.S. Pat. No. 6,301,609 granted to Aravamudan, et al. on Oct. 9, 2001 and entitled "Assignable Associate Priorities For User-Definable Instant Messaging Buddy Groups" that is incorporated by reference herein in its entirety.

Examples of four commonly used software at a workstation, for instant messaging are: ICQ, MSN Messenger, Yahoo Messenger, and AOL Instant Messenger (AIM). Each of these software programs has, in the past, used proprietary interfaces and protocols to transfer instant messages among users, although newer software programs, such as Trillian 0.71 and Odigo 3.1 provide an interface to (and communicate with) the just-described four instant messengers.

According to a review article on the Internet at the website www.cnet.com, it is possible to "Switch Trillian 0.71's look and feel by downloading skins. We downloaded a few colorful ones from Cerulean's site and DeviantArt and settled on a skin that looks a lot less artistic but is much more functional." Trillian is just one example of an instant messenger whose look and feel can be changed by use of different skins (also called "themes"). Other examples of instant messengers that support use of skins include MyCQ, ICQ with ICQPlus, Odigo and Yahoo Messenger.

Software that supports skins (also called "skinnable software") is not limited to instant messengers. Other types of skinnable software include video games (such as Quake), media players (such as WinAmp and Windows Media Player), browsers (such as iNet-Tabs and BrowserBob, WebBlinds and Themebar), calculator (such as Beautiful Calculator from RaysLab), Microsoft Windows operating system desktop (such as eFX, Aston, Chroma, Cloud9ine, CustomEyes, Litestep, DarkStep, WindowBlinds), e-mail notificators (such as EzPop and Incredimail), file sharing utilities (such as eDonkey 2000), wcbcam utility (such as Argus 0.6b), news tickers (such as AMINews and HoverNews), message boards (such as Toast Forums 1.5), sticky notes reminder/scheduler (such as Aversoft Sticker), file transfer programs (such as 3D ftp), and Visual Basic applications (by use of Vbskinner available at sourcccode.8m.com/VBskinner/index.html).

To change a skin in certain prior art skinnable software, the user manually performs a number of acts such as the following: (1) download a file from a website of skins (e.g. Cerulean Studios' website) onto the desktop (2) unzip the file into a skins folder in the application folder (e.g. c:\program files\Trillian\skins\) while ensuring that the skin is placed only one directory deep (e.g.\skins\TrillianXP\trillian.xml) (3) load up the application (e.g. Trillian) and access preferences and (4) choose the 'Skins' option from and launch the skin chooser. If these four steps are performed correctly, the user is able to see the new skin and select it. At this stage, if the newly-downloaded skin is not available as one of the choices, the user must double check the previous steps while keeping in mind that only certain versions of skins will work on certain versions of the software. Once a newly-downloaded skin is selected in the application, the user must restart the application to actually experience the new look.

For more information on skinning, see the article entitled "The World of 'Skinning' an introductory primer" which is available on the Internet at www.stardock.net/media/skinprimer.html and this article is incorporated by reference herein in its entirety. See also another article entitled "Windows Customization 2002 A Primer" by Bradley Wardell, published April 2002, on the Internet at www.stardock.com/stardock/articles/skinprimer/skinprimer2002.html

SUMMARY

In certain embodiments of the invention, when two or more users use skinnable software, each user may share their skin with the other user. During reciprocal sharing, each user's skin is displayed to the other user. Such sharing of skins is done automatically in some embodiments, without any of the users doing anything other than the acts that the users normally perform in using the skinnable software. The just-described sharing of skins may be implemented in any skinnable software, although in some embodiments, the software is communication software (such as an instant messenger), and only users that are communicating with one another are involved in skin sharing.

In certain embodiments, a display of each user's skin is periodically replaced with a display of one (or more) other user(s) skin. For example, in a first user's instant messenger, the display of the first user's skin is automatically replaced by a display of a second user's skin. Similarly, in the second user's instant messenger, a display of the second user's skin is automatically replaced by the first user's skin. After a few moments, the just-described acts are performed in the reverse order, so that each user's own skin is displayed by their respective instant messenger. Then the entire process is repeated, thereby to alternately display the two skins to each user. Such a changing display of each user's skins to one or more other users results in a common shared experience for the users, thereby to allow, for example, sharing of each user's feelings with the other user(s). Depending on the embodiment, during a skin sharing process, the users may also communicate with one another, in this example by use of their instant messengers (e.g. by sending to one another text messages and/or emoticons and/or voice signals).

Although an instant messenger is one example of software in which skin sharing can be implemented, skin sharing as described herein can be implemented in any other software, such as chat software, email notification software or even browser software.

BRIEF DESCRIPTION OF THE DRAWINGS

FIGS. 2A-2C illustrate sharing of skins of instant messengers between users of two computers, in several embodiments of the invention.

FIGS. 5A-5G illustrate various screens used to install a new skin in an instant messenger in accordance with the invention.

DETAILED DESCRIPTION

In accordance with the invention, a computer is programmed with skinnable software, and initially displays a skin to the user. The skin (also called "first skin") that is displayed to the user may be a default skin (which is provided with the skinnable software), or alternatively a skin that the user has obtained. For example, the user may visit a website to download a skin or the user may create a skin of their own, depending on the embodiment.

Figure 1A:
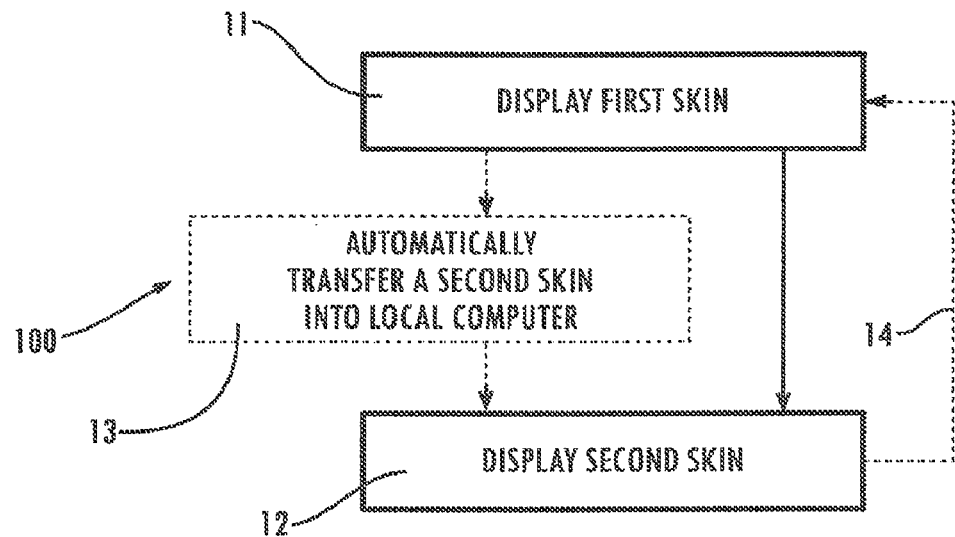
FIG. 1A illustrates, in a flow chart, acts performed in accordance with the invention to display different skins to a user.

Regardless of how obtained, the computer (also called "local computer") initially displays a first skin (as per act 11 in FIG. 1A). Thereafter, at some later time, the computer displays a second skin to the user (as per act 12 in FIG. 1A). When displaying the second skin, the first skin gets replaced in some embodiments, although in other embodiments, only a thumbnail or other indicator of the second skin is displayed in act 12 (resulting in a display of both skins). In most embodiments, the second skin is displayed without requiring the user to restart the skinnable software.

In certain embodiments, prior to act 12, a second skin is automatically transferred (as per act 13 in FIG. 1A) into the local computer, without requiring the user to perform any acts of the type required in the prior art described above. In several embodiments, automatic transfer is performed only if the second skin is not present on the local computer, while in other embodiments an automatic transfer is performed regardless of the presence or absence of the second skin on the local computer. In some embodiments, the automatic transfer is performed without any user involvement, while in other embodiments the user's permission is expressly sought (either prior to transfer or prior to display of the second skin). In several embodiments, the user provides permission ahead of time, as an option (that can be enabled or disabled) for the skinnable software.

In some embodiments, a user need not perform any acts to specifically download or display a second skin. Instead, the second skin is automatically downloaded, in the background, without involving the user in any manner. Thereafter, the remote user's skin is displayed to the local user. Note that during the display of the remote user's skin the local user may use (or continue to use) functionality provided by the skinnable software in the normal manner. For example if the user is in the process of typing a message when the skin display changes, the user can continue to type the message.

Therefore, in some embodiments, the user experiences a change in the display of a skin, without explicitly downloading and/or installing a skin. In some such embodiments, the skinnable software remains in its current state before and after the skin display changes, and the skinnable software is not passed through a reset state. So, any data that was displayed prior to the skin change (e.g. a history of text messages that were recently exchanged) continues to be displayed after the skin change. In some embodiments, all functionality of the skinnable software remains the same, while in other embodiments, one or more buttons in the software that are associated with a skin are changed when the skin is changed.

The skin replacement is effected in one embodiment by simply replacing a skin pointer in the skinnable software with another skin pointer (which points to the new skin). Therefore, the current state of the skinnable software remains identical before and after the skin replacement, except for the change in skin pointer. Depending on the embodiment, both skins may be made memory resident, so that replacement of a skin is done instantaneously (from the user's perspective).

Figure 1B:
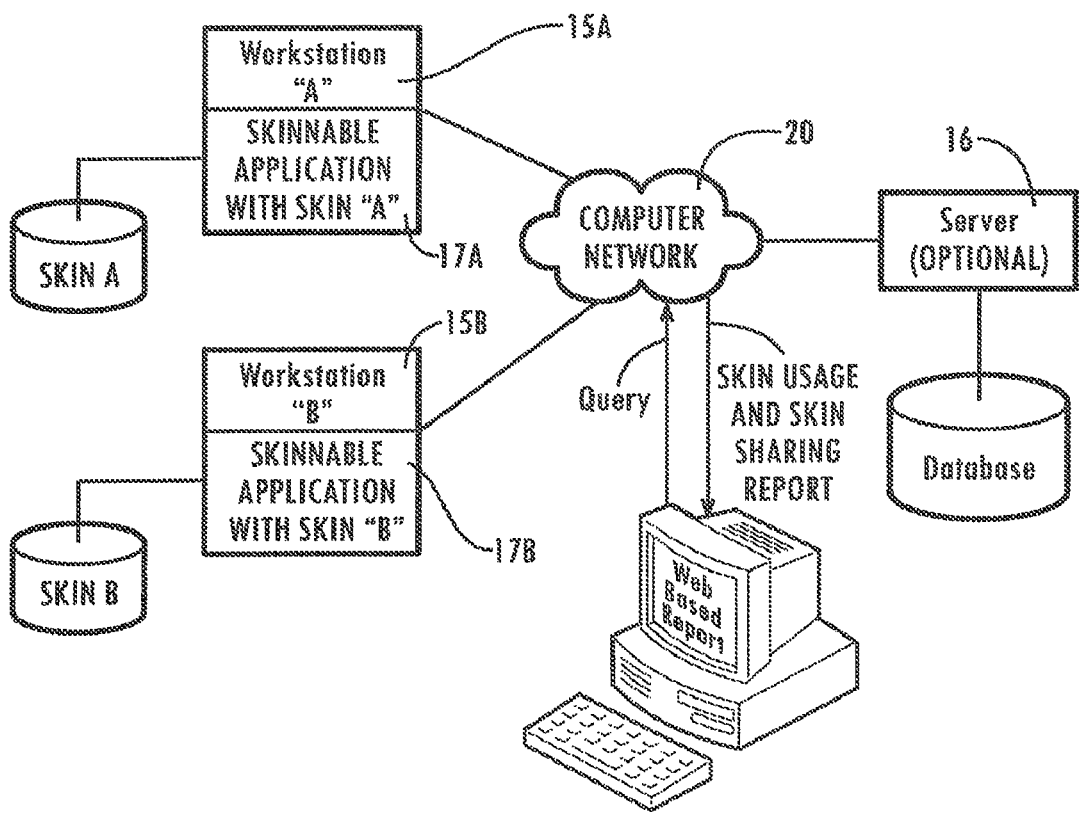
FIGS. 1B-1D illustrate, in block diagrams, the display of a skin selected by a local user, transfer of a remote user's skin to the local workstation, and display of the remote user's skin.
Figure 1C:
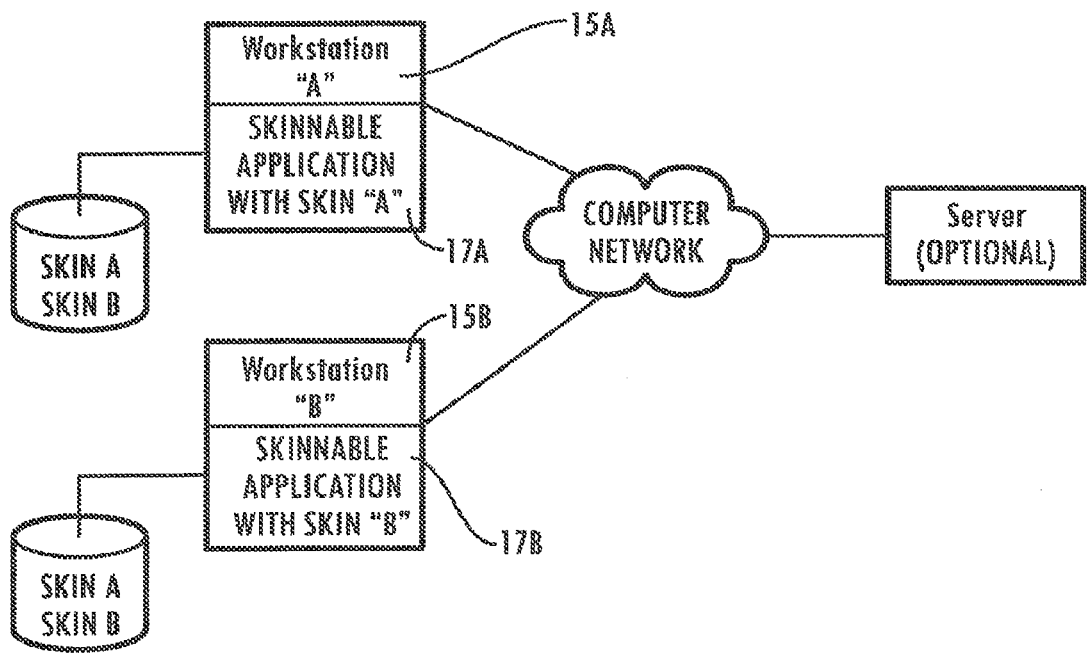

In one particular example, both skin files are resident on workstation 15A as shown in FIG. 1C. Skinnable application 17A in workstation 15A has pointers to the users skin file "skin A" and to another skin file "skin B" that their buddy is using. At each skin share, application 17A swaps the pointer and using a transition effect fades one image into the other. Note that the first time a skin is used, it is loaded into a main memory of the workstation, and is accessed from there all subsequent times it is used.

In certain embodiments, after performance of act 12, act 11 is again performed automatically (as per branch 14 in FIG. 1A). Branch 14 may be performed in an event driven manner, e.g. after a predetermined time period (such as 20 seconds) has elapsed or after one or more predetermined acts have been performed by the skinnable software. Regardless of how branch 104 is taken, repeated performance of acts 11 and 12 results in an alternating display of the first and second skins. Moreover, although some embodiments alternate between the display of just two skins, other embodiments may rotate through the display of a number of skins (wherein the number is more than two).

In the above-described process, a second skin that is displayed to a user may be selected in any manner, depending on the embodiment. For example the second skin may be predetermined by the user in some embodiments, although in other embodiments the second skin is currently in use by another user with whom the user is communicating. Therefore, in some embodiments, the computers of two different users perform method 100 (sec FIG. 1A) simultaneously, and each computer displays its own user's skin as the first skin, and displays the remote user's skin as a second skin.

Figure 1D:
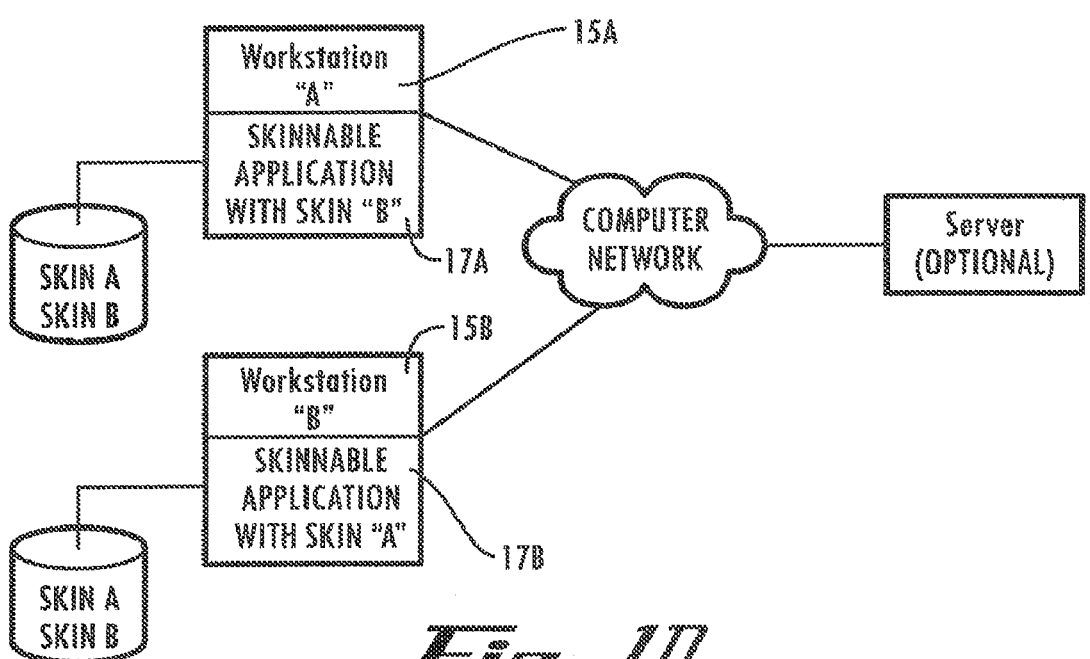

In an embodiment illustrated in FIGS. 1B-1D, users access information and interface with a computer network 20 (such as the Internet) through workstations 15A and 15B. Workstations 15A, 15B execute software (such as an instant messenger, a chat client or an email client) for presenting information from, and entering data and selections as input to interface with network 20. Depending on the embodiment, workstations 15A and 15B also execute one or more application programs to establish a connection with a server 16 (if present). Information can also be shared between workstations 15A and 15B directly without a server. Such a peer-to-peer network allows two or more users to access information stored on each other's workstation directly via network 20.

Assume that workstations 15A and 15B are programmed with skinnable software, and display skins A and B respectively (which are typically stored in their respective storage media, such as a hard disk), as illustrated in FIG. 1B (by performance of act 11 of FIG. 1A). Assume that neither workstation has the skin being displayed by the other workstation. In such a case, performance of act 13 of FIG. 1A results in the skins currently displayed in each workstation being transferred to the other workstation. Therefore, each workstation's storage medium contains both skins A and B, as illustrated in FIG. 1C. Next, performance of act 12 of FIG. 1A results in the skinnable software in workstation A displaying skin B and vice versa, as illustrated in FIG. 1D.

Sharing of skins between two or more users may be implemented in any skinnable software. In some embodiments, a display of each user's skin is periodically exchanged with a display of another user's skin. The periodicity at which the displays are changed for each user may be predetermined in some embodiments, while other embodiments may allow each user to select their own time period (in which case the skin display changes at a different rate for the two users). In some embodiments, each user may specify a time period for which their own skin is to be displayed to the user, while other embodiments may allow each user to specify the time period for which their own skin is displayed to the other user. Also, some embodiments may allow each user to specify the total number of times their own skin display may be changed (i.e. alternated with another user's skin display).

In some embodiments, replacement of one skin with another skin involves the use of a transition effect (such as smooth fading, box in/out, horizontal/vertical blinds, checkerboard, newsflash, wipe down/up/left/right or any other transition of the type available between POWERPOINT slides), although in other embodiments no transition effect is used. Several embodiments allow the user to select a specific transition effect to be used, although in other embodiments the transition effect is predetermined. Moreover, some embodiments allow a user to identify a transition effect to be associated with their own skin, so that display of their skin to any user is preceded (or followed) by the associated transition effect.

Figure 2A:
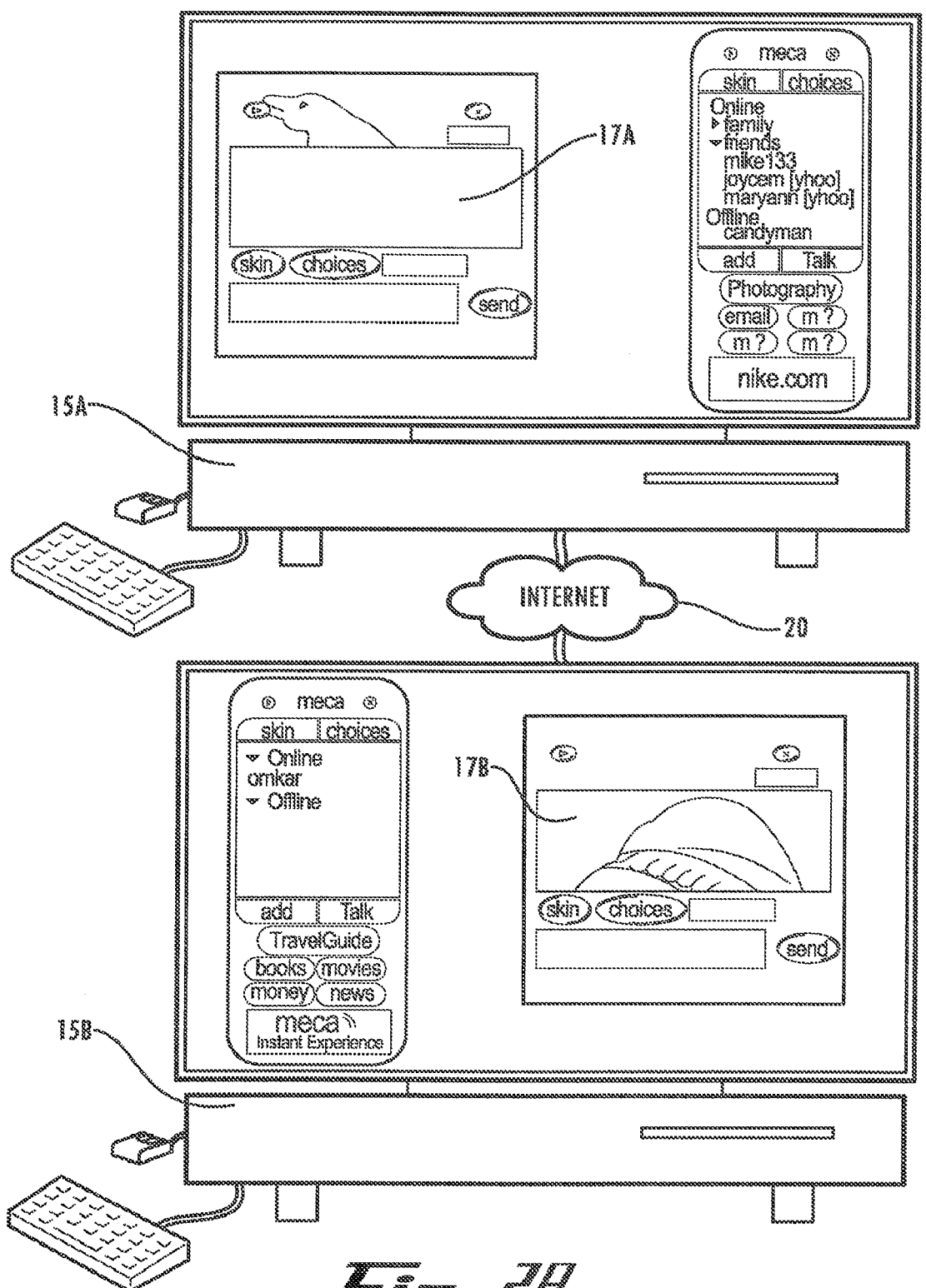
Figure 2B:
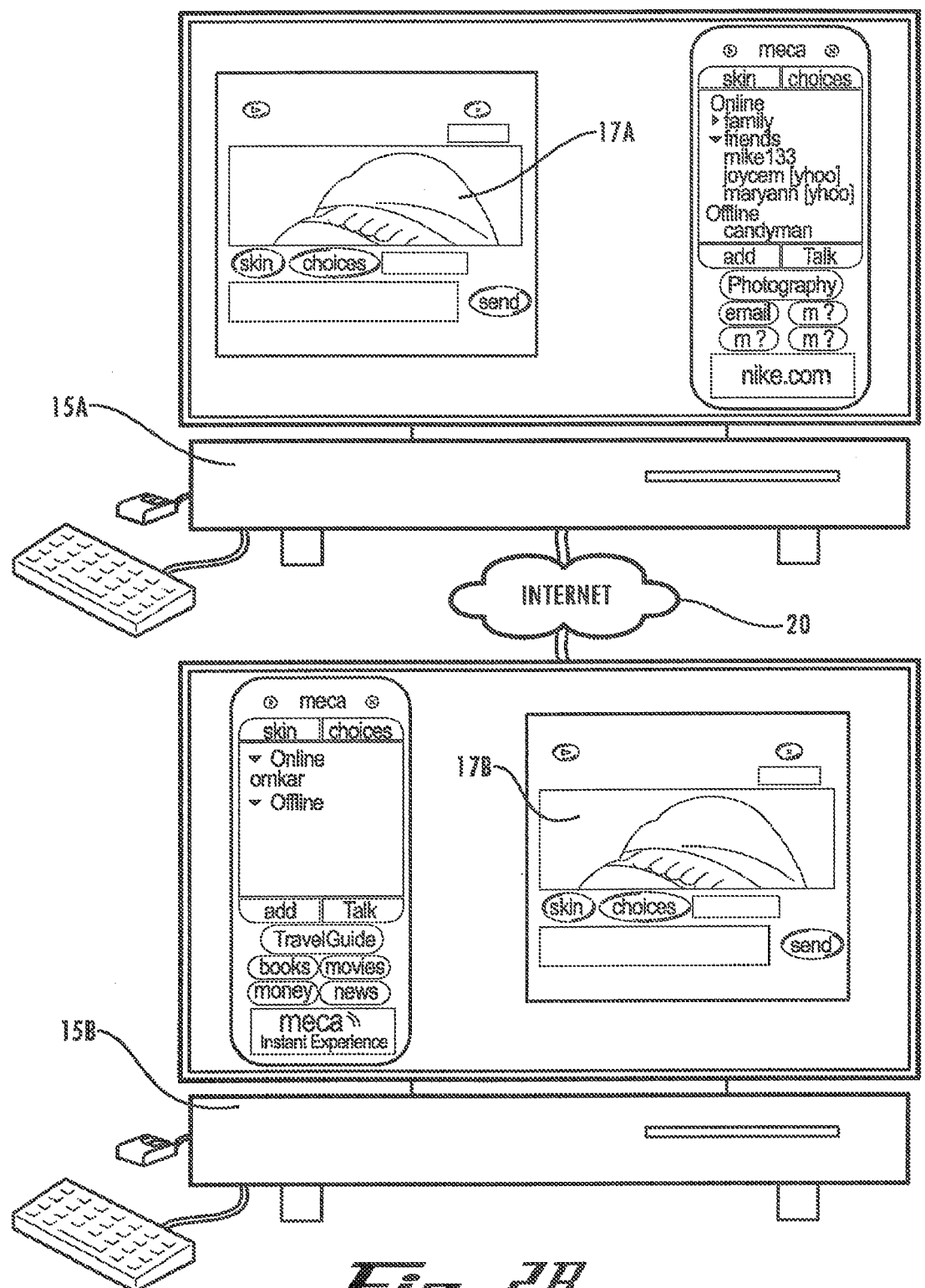

In one example, the display of a first user's skin in an instant messenger (FIG. 2A) is automatically faded out (FIG. 2B) and replaced by a display of a second user's skin (FIG. 2C). In this example, the periodicity is the same for both users, and therefore a display of the second user's skin (FIG. 2A) is automatically faded out (FIG. 2B) at about the same time, and is replaced by the first user's skin (FIG. 2C). At this point each user's skin is being displayed to the other user. After a few moments (after performance of branch 14 in FIG. 1A), the just-described acts are performed in the reverse order, so that each user's own skin is displayed to that user (FIG. 2A). The entire process is repeated, in a periodic manner.

Figure 2D:
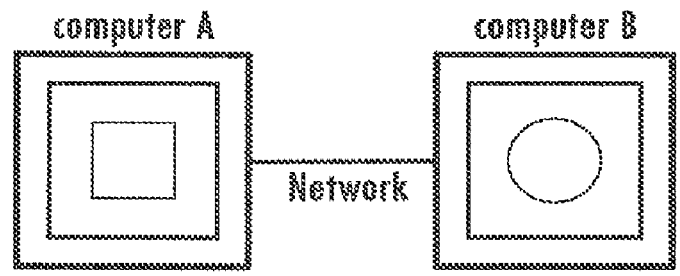
FIGS. 2D-2G illustrate the fading of one skin and appearance of another skin in each of two computers, using a square and a circle as illustrations of two skins.
Figure 2E:
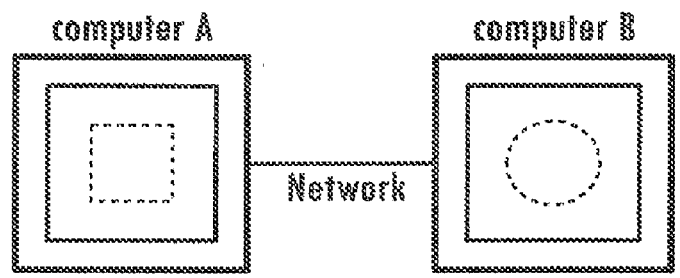
Figure 2F:
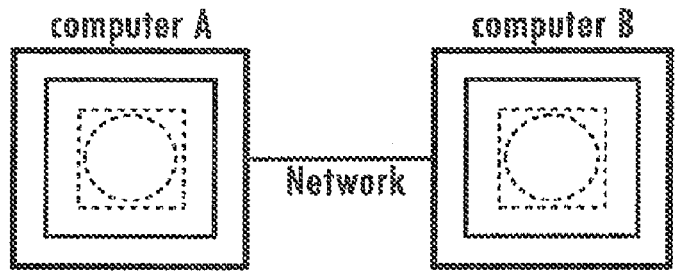
Figure 2G:
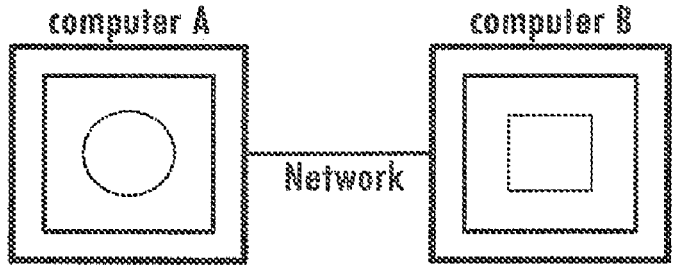

FIGS. 2D-2G further illustrate the skin replacement by automatic fading out and automatic fading in of two skins which are illustrated as a square and a circle. Specifically, in FIG. 2D, computer A displays the square skin and computer B displays the circular skin. In FIG. 2E, the square is faded in computer A and the circle is faded in computer B. Next, in FIG. 2F, each of computers A and B displays both skins, namely the square and the circle are both shown in a faded manner. Finally, FIG. 2G illustrates computer A displaying the circle skin while computer B displays the square skin. At this stage the two skins have been completely interchanged. The just-described process is thereafter performed in the reverse manner, so that eventually computer A displays the square skin (which was its original skin) and computer B displays the circle skin (which was its original skin) as illustrated in FIG. 2D (i.e. FIGS. 2G, 2F, 2E and 2D are visited successively). The entire cycle is repeated a number of times, depending on the embodiment.

Although in some embodiments, each of computers A and B are programmed with the same client software, such as an instant messenger, in other embodiments, other client software may be used. For example, in one alternative embodiment, computers A and B are both programmed with browser software as the client. In another alternative embodiment, computer A is programmed with browser software as the client and computer B is programmed with an instant messenger as the client. Moreover, in some embodiments, computer A is programmed with Microsoft Windows as the operating system which is the client (and the skin is for the Windows operating system), whereas computer B is programmed with Linux as the operating system which is the client (and the skin is for the Linux operating system). Skins may also be exchanged between an operating system client in computer A and an application program client in computer B, such as browser software for example.

Therefore, sharing of skins can provide a joint experience to two users: an alternating display of the two skins to each user. Such sharing of skins is done automatically in some embodiments, without either of the two users doing anything other than the acts that the users normally perform with their instant messengers. In some embodiments, each user must explicitly approve the sharing of their skins. In such embodiments, if only one user has approved sharing of their current skin, then the other user is the only one to experience the alternating display of two skins (because this other user's skin is not shared). In other embodiments, unless both users have approved sharing of skins, there is no alternating skin display. Note that in several embodiments, the user has a choice of approving each skin for a particular group of users, such as users on their buddy list, and sharing of skins with non-buddys may be disapproved by the user (as an option).

In the above described example (FIGS. 2A-2C), the two users may have individually customized their instant messengers (e.g. by installing skins of their own choice by just pointing and clicking on a skin of interest from a set of thumbnails as described below in reference to FIGS. 5A-5G). Depending on the embodiment, users may have access to multiple skins stored locally in their workstations, and the users may have the option of designating a skin as the default skin that is currently in use.

A skin that a user loads into their computer (e.g. into their instant messenger application) is akin to clothes (and/or cosmetics) that a user physically wears in the real world. Selection of a skin by a user provides an expression of self, but not a message directed at a specific person (such as a text message or emoticon). Hence, users may express their individual moods online simply by selecting an appropriate skin (which is automatically displayed to one or more other users), without concern that the other user(s) will misinterpret their skin selection as a personal message. Transfer and/or display of skins between users is performed automatically and simultaneously in some embodiments, whenever two (or more) users communicate with one another, e.g. via instant messengers or chat clients.

Moreover, in the above described example (FIGS. 2A-2C), the two users also communicate with one another, by use of their instant messengers in the normal manner (e.g. by sending to one another text messages and/or emoticons and/or voice signals). Therefore, users can display an expression of their own personal tastes and preferences in an intuitive visual manner to other users, while communicating via their instant messengers.

Depending on the embodiment, skins can be shared directly between workstations in a peer-to-peer network, as well as between a server and one or more workstations. Certain embodiments reduce the communication bandwidth required to implement skin sharing: by storing transferred skins on a receiving workstation. On each new access to a skin, a skin manager in the workstation displays the locally stored skin unless a newer version of the skin exists on a server or on the other user's workstation in which case the newer version skin is downloaded in the background.

When using instant messengers, users exchange messages with each other instantly (in a session called "messaging session") either via server 16 or directly in case of a peer-to-peer network. A messaging session allows users to quickly exchange messages with other users who are online. Messaging sessions of the type described herein can be established using any skinnable instant messenger such as ICQ (with ICQPlus), Trillium, or Yahoo! Messenger from Yahoo! Inc.

Note that a skinnable e-mail client may also be used in the manner described herein, in place of an instant messenger. Unlike electronic mail, instant messages appear as soon as they are sent. One differentiation is that e-mail is "pulled" by the user while instant messages are "pushed" from one user to the other. E-mail can be configured to check for mail every second thus giving the appearance on instant response. Regardless of how often mail is checked, an e-mail client software (such as Outlook) can perform method 100 (FIG. 1A) by displaying the skin of an e-mail sender to the e-mail recipient whenever the e-mail recipient reads the message from the sender (which is an example of branch 14 in FIG. 1A being implemented in a non-periodic manner). The e-mail recipient may optionally turn off such a skin display.

Furthermore, instead of a messaging session, a "chat session" may use a changing skin display of the type described herein (except that instead of two skins, a number of skins are displayed, in a rotating manner). Chat refers to another method for two or more users to exchange messages instantly with each other via server 16 or peer-to-peer network. A chat session may be initiated from any of 3 places: (1) by clicking chat button in message window (now caption of the button is invite to be changed to chat). Message window will be kept open, (2) by clicking chat button in the buddy list (a chat button to be added there), or (3) from options menu. Clicking the chat button in any place opens a chat invitation form. The user can invite online buddies from the buddy list, and there is another tab to invite non-buddies. When a user initiates or joins a chat session, a message window appears that allows users to view messages from other users.

Buddies already chatting are notified when another buddy joins the chat session by the message 'X has joined the conversation.' Buddies already chatting are also notified when a buddy leaves the chat session by the message 'X has left the conversation.' Buddy who invited a certain user to the chat is displayed a message when this user declines the invitation (e.g. by a pop up message or in the conversation area).

A message entry window allows the user to enter and edit a message. When a send option is selected after the user is satisfied with the message just created, the message is added to end of the messages currently visible in the message window. Also, the message is sent to all buddies in the chat session. A list of users who have joined the chat session is also typically displayed in the message window. Such chat sessions can be established using client software that is available from commercial vendors, as well as shareware sources. A skinnable chat client can be used in the following manner in accordance with the invention: in case of a chat session among three users A, B, and C, their corresponding skins 1, 2 and 3 are faded from A to B, B to C, and C to A. The next rotation would follow suit:

| Time 1 | | Time 2 | | Time 3 | |
|---|---|---|---|---|---|
| User A | Skin 1 | User A | Skin 3 | User A | Skin 2 |
| User B | Skin 2 | User B | Skin 1 | User B | Skin 3 |
| User C | Skin 3 | User C | Skin 2 | User C | Skin 1 |

In another embodiment, there is no fading of skins in a chat session, and the chat window is not skinnable. Instead, all users in the chat sessions are displayed a thumbnail of their current skin (which is rotated as noted above). This thumbnail is clickable and when clicked takes the user to preview the skin; and in preview window a bigger thumbnail picture (75% of message window size) is displayed, with the option to get the skin into their skin manager (but not selected as current skin) and a close button. The thumbnails for a chat session are downloaded from the server and stored in a temporary folder of its own (i.e. unique to the chat session), and are deleted at the end of the chat session. Note that a check for updated skin is performed in many embodiments, whenever a buddy changes his/her skin.

In addition to the just-described thumbnail, in some embodiments of a chat client, a thumbnail of each user's skin is displayed next to that user's screen name. Depending on the embodiment, a user may have the option to turn on/off fading with one or more selected users, while in other embodiments there may be no option.

Figure 3H:
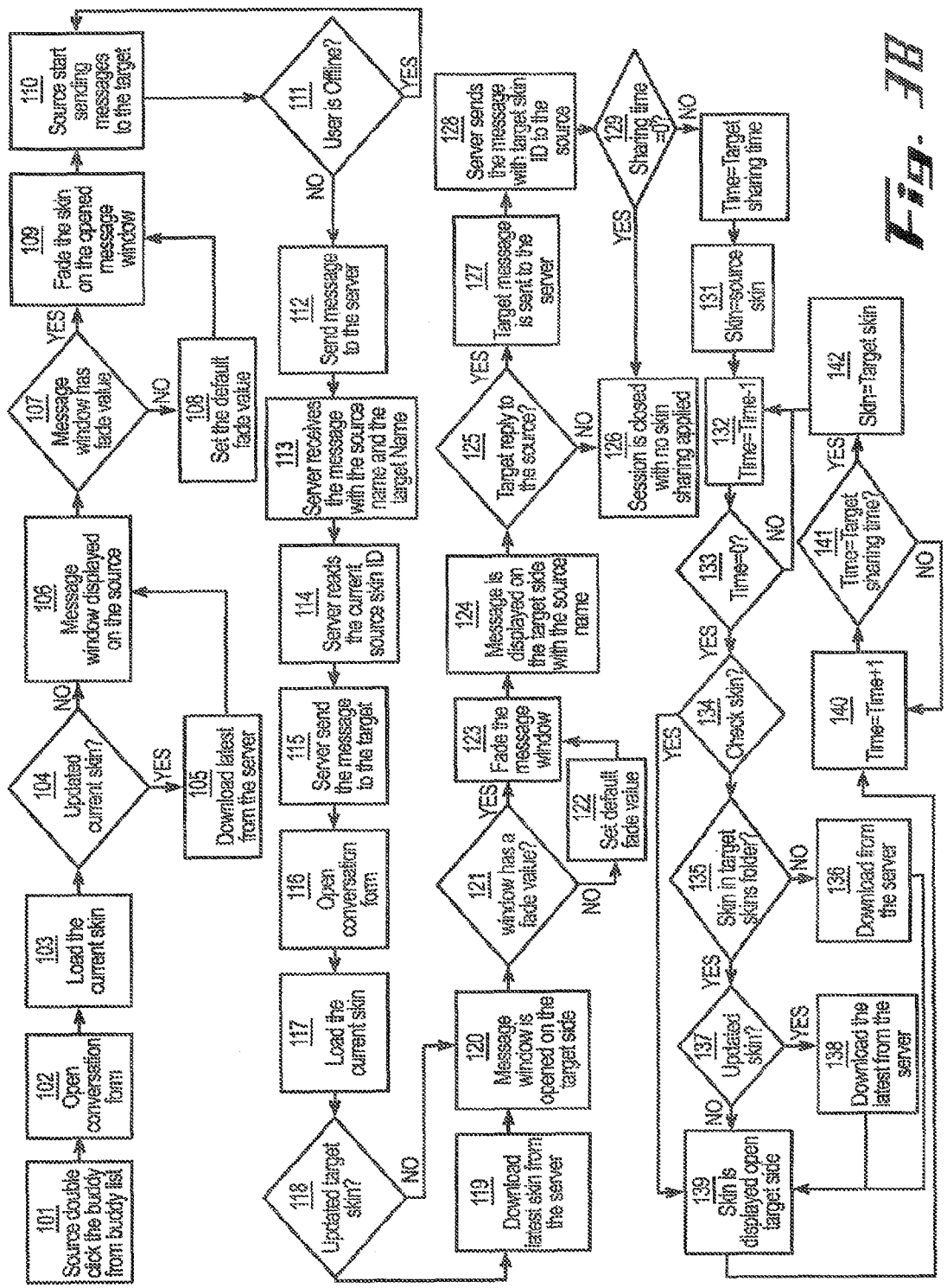
FIG. 3A illustrates examples of messages communicated between a server and a workstation for skin sharing in some embodiments.
FIG. 3B illustrates, in a flow chart, acts performed in some embodiments, to share skins.

FIG. 3 shows messages related that are communicated between a workstation 15A and a server 16 in some embodiments, for validating a user, access to the server skin library and communication required between a skin manager 15S in workstation 15A and a server skin manager 16S in server 16 to enable skins being delivered to a client application, such as instant messenger 151. Note that when peer-to-peer network is used, workstations 15A and 15B perform functions associated with both skin manager 15S and server skin manager 16S.

Parameters that can be used in one or more of the messages include:
Username[n]—identifying name of nth user participating in the session;
Password[n]—used to authenticate user;
Userstatus[n]—provides user's status code (e.g., online, offline, etc.);
Requested ID—Identification code of skin requested by a user;
Database ID—database identification code of a skin;
Pointer—pointer to skin corresponding to Skin ID (e.g., an address or other identifier);
Version number[n]—version number of the component;
Error Code—error code indicating reason for failed download of a skin.

Referring to FIG. 3A, upon initially establishing an instant messaging or chat session, skin manager 15S sends an "authenticate client" message 31 with the username and password of the user to server skin manager 16S. Server skin manager 16S verifies the identity of the user and issues a reply 32 indicating whether or not the user was authenticated. If the user was authenticated, skin manager 15S issues a "request skin" message 33 with an identification code of a skin that is being requested (e.g. as per a selection by the user of source workstation 15A). If the skin is available, server skin manager 16S transfers the requested skin 34. In an alternative embodiment, instead of transferring a skin, server skin manager 16S simply provides a pointer which represents a location where the skin can be found. One example of such a pointer is a universal resource locator (URL). Other types of pointers can also be used, depending on the methods available for accessing files in network 20.

In one implementation, skin manager 15S locally stores the received skins in a disk drive (and temporarily in main memory) for faster subsequent access. Prior to usage of a skin, some embodiments determine if the skin in the local directory of the workstation 15A is the most current version. Specifically, a "check skin version" message 35 (see FIG. 3A) is sent from workstation 15A to server 16 and includes a skin identifier (such as a database ID parameter) and a checksum such as md5. In response to the "check skin version" message, server skin manager 16S sends a "skin is current" message 36 to workstation 15A if the checksum md5 matches with a corresponding checksum of the skin held in server 16.

Although the latest version of the skins is normally present, in the event there is no match, the skin is current message is not sent, and instead the current version of (or pointer to) the skin in server 16 is sent. When skin manager 15S attempts to download a skin, a "download failed" message can be sent to server skin manager 16S if the download is not successful. The message includes the skin identifier, and the pointer for the skin, as well as an error code indicating the reason for the failure.

Once the information pertaining to the skin versions is received in workstation 15A, skin manager 15S displays the current version skin to the user, receives an instant message from the user for display on the target workstation and thereafter sends the instant message 37 to server 16. The target user may respond with their own message 37 to be displayed on source workstation 15A. The target user's message also identifies the target user's skin. If the target user's skin is not locally present in source workstation 15A, that skin is obtained from the server as per messages 38 and 39, in the above-described manner. Thereafter an exchange of instant messages 40 occurs, in the normal manner except that during the exchange each workstation will alternate between display of the source and target skins.

Note that if on receipt of the target message initially, the target user's skin is found locally within source workstation 15A, then a check skin version message 35 and a skin is current message 36 may be generated (if the skin is current).

A message exchange of the type illustrated in FIG. 3A can be performed by any of a number of different implementations of a skin manager 15S and server skin manager 16S as would be apparent to a skilled artisan. One such implementation is illustrated in FIG. 3B and described in Table 1 (which is a part of the present description, located at the end just before the claims). FIG. 3B and Table 1 are merely illustrative of one specific implementation of the invention and are not meant to be limiting, because other implementations will be apparent to the skilled artisan in view of the disclosure.

In some embodiments, when a server skin manager 16S provides an indication of the source user's skin to a target user, the server skin manager 16S also maintains a log of the following: the target user's identity, the source user's identity, the target user's original skin id and the source user's original skin id, and date and time of the exchange of skins and the duration for which the skins were exchanged. In other embodiments, not all of the just-described information may be logged. For example, the identities of the users may be not maintained, so as to ensure anonymity of which user is using which skin, although the remaining statistics may be logged (e.g. the target user's original skin and the source user's original skin, and date and time of the exchange of skins and the duration for which the skins were exchanged).

At approximately the same time as logging by the server, in many such embodiments, display of original skins is faded out for each user and the other user's skin is displayed, as described above. Moreover, in many embodiments that implement logging of such information, server 16 also implements web-based reporting of the logged information, e.g. to summarize the usage of each skin, or provide real-time statistics of the number of source users of each skin and the number of target users of each skin. For more information on logging of statistics, see client3.txt at line 208 and server3.txt at line 17, which illustrate the logging of what skin a user has and when they change skins, etc.

In the just-described embodiment, statistics logging happens on server 16, with a command to do the skin change coming from the client. Note that in peer-to-peer networks, information logging of the type described may be performed in each of the clients (e.g. in one embodiment each client logs information about its own user, while in another embodiment each client logs information about both users). Furthermore, even in some server-based embodiments, information logging happens on each client, and the clients send the logged information to the server (e.g. in real time) for storage in a central database (e.g. from Oracle Corporation). The server may be programmed in the normal manner to supply a report (e.g. web-based report) of the information stored in the database, in response to a query. Such a report may contain statistical information on skin usage and on skin sharing. Therefore, in some embodiments, a server may even provide real time reports on users' usage of skins. If the skin being shared is provided by an advertiser, then advertising revenues may be based on such statistics.

Statistical information on skin usage and/or skin sharing may be used in any manner, depending on the embodiment. For example, in some embodiments, skin usage statistics may be used to identify advertisements or other information to be displayed to the user (e.g. in the skinnable application or in another application that is not skinnable). For example, if a user has a Tennis skin, then advertisements related to Tennis may be displayed to the user. Additional information displayed to the user may include, for example, identification of additional skins that may be of interest to the user, limited-time offers for goods or services, surveys, etc.

In some embodiments, when a skin is transmitted to a client for skin sharing, a check for new version of the skin is made, by comparing the md5 checksum of a version that may be present in the client computer and the md5 checksum of the version on the server computer 16. In this manner, a display of a skin that is out of date is minimized or even avoided. For more information on such comparison, see client1.txt at line 211 and server2.txt at lines 25-33.

Figure 4I:
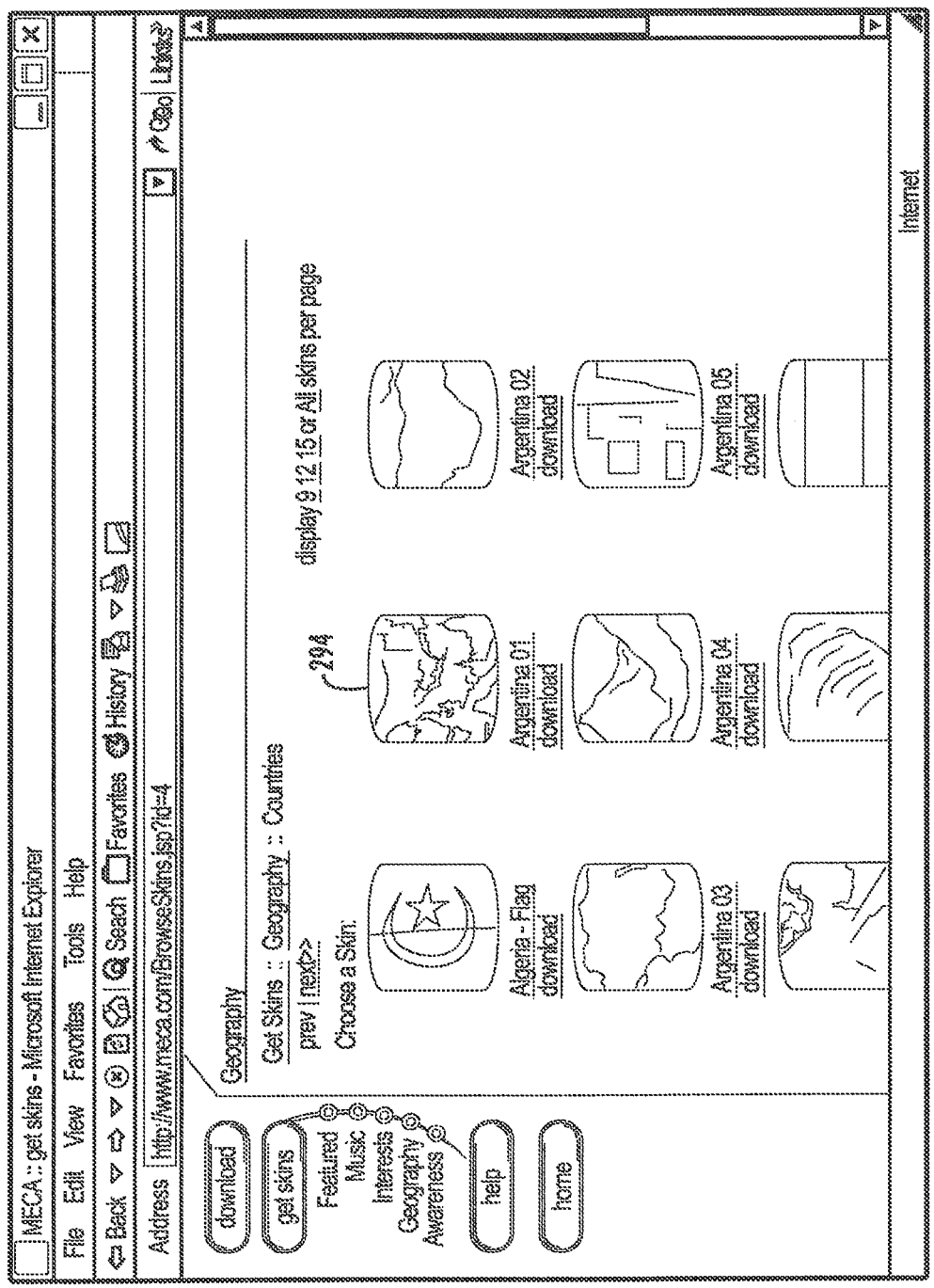
FIG. 4A illustrates, in detail, various features of a message window and a buddy window respectively of a user interface of an instant messenger being used in one embodiment.
FIG. 4B illustrates a drop down list boxes associated with a button that is part of a skin on a buddy window in the user interface of FIG. 4A.
Figure 50:
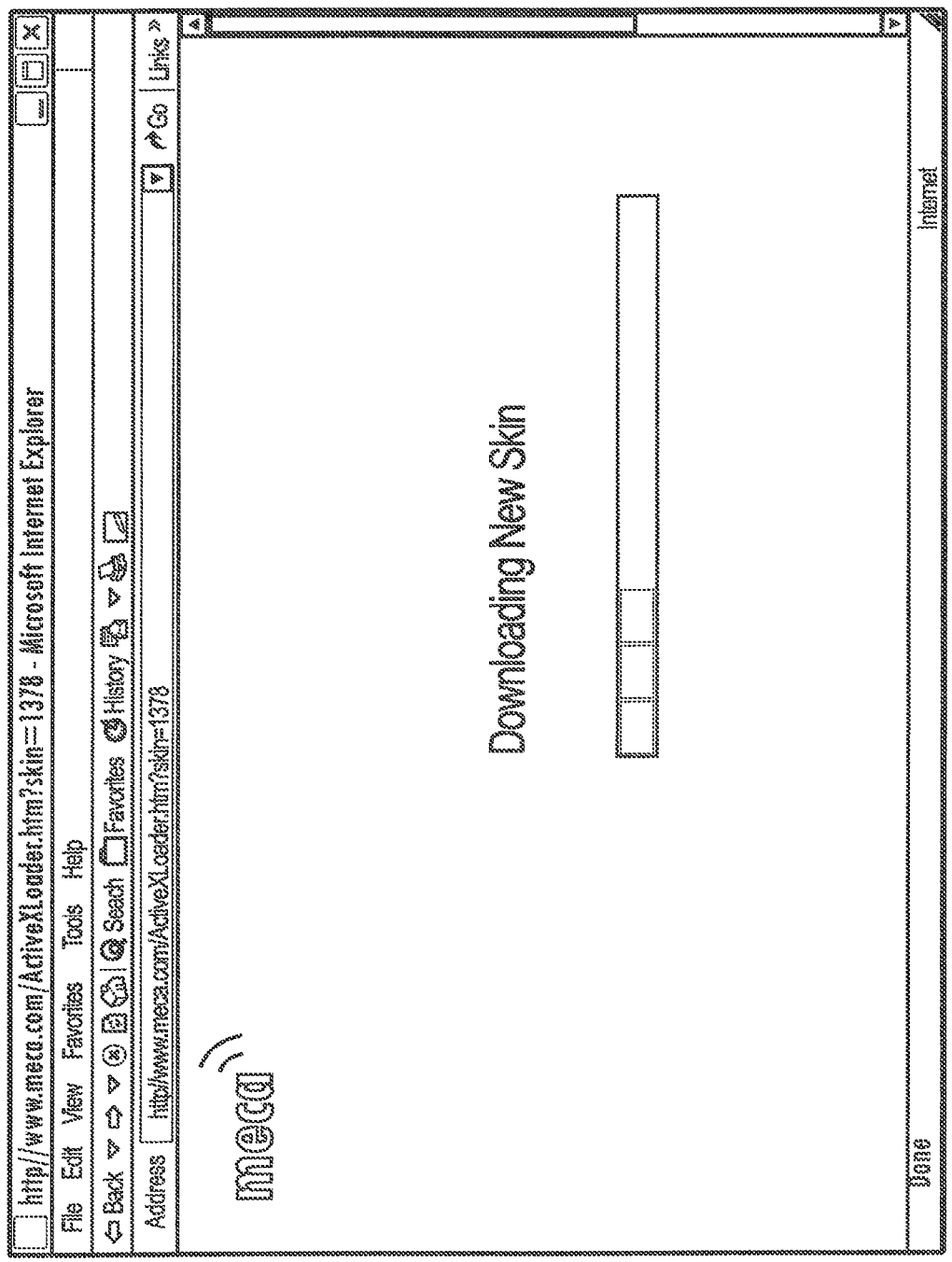
Figure 5F:
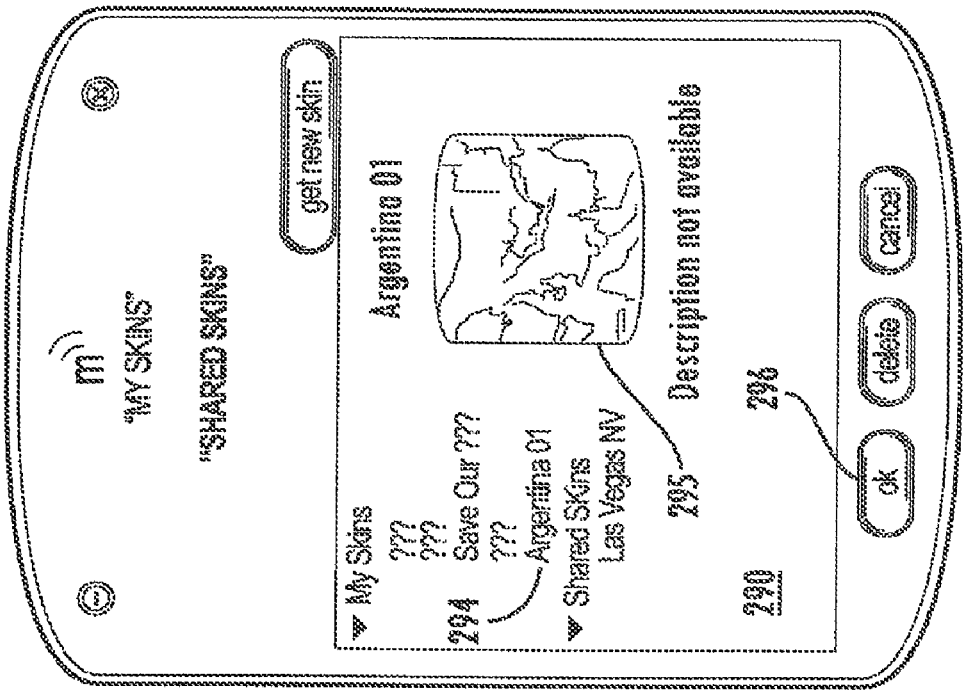
Figure 5E:
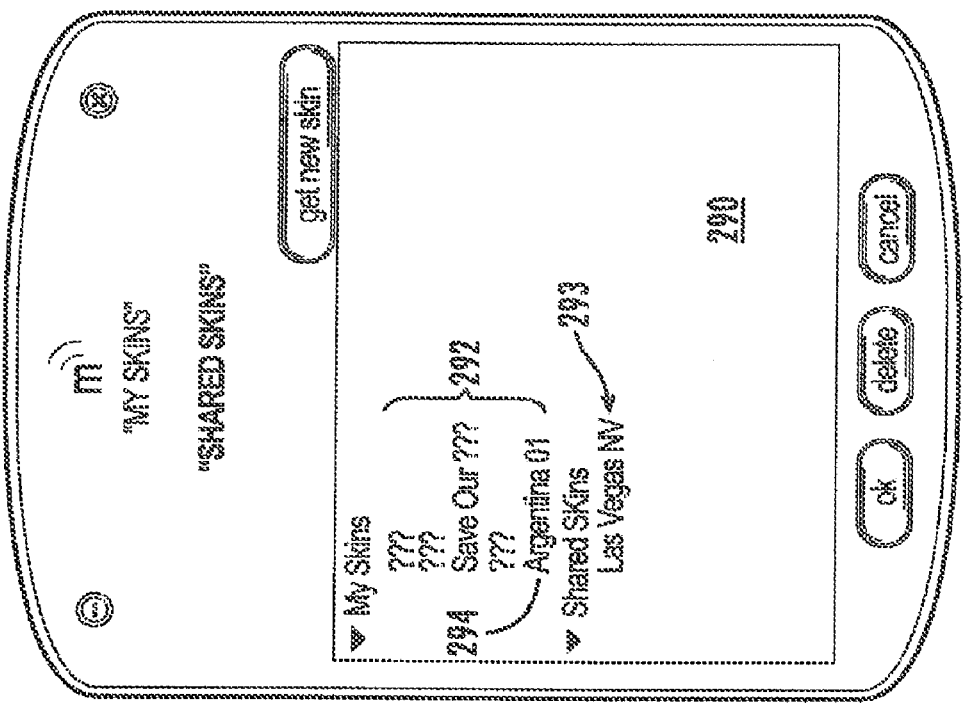

Referring to FIG. 4A, one implementation of a skinnable instant messenger has a message window 202 and buddy window 204 that are output simultaneously on a display 200. In other implementations, message window 202 and/or buddy window 204 can be represented as an icon, repositioned, resized, and/or overlayed with one another. In the example shown in FIG. 4A, message window 202 includes a background image 206, message region 208, status bar 210, utility buttons 212, skin button 214, "choices" button 216, invite button 218, edit window 220, and send button 222. Background image 206 can include any type of graphic selected by the user. Message region 208 shows the dialog between users during a messaging session. Status bar 210 shows actions being taken by one of the other users involved in the messaging session, e.g. to indicate when the other user is currently typing a response or away from their computer, workstation or communication point such as a cell phone or other messaging device.

Utility buttons 212 allow the user to invoke utility programs and/or change settings for various options. For example, the utility buttons 212 in FIG. 4A allow the user to change the type font, invoke a spelling checker, express an emotion using emoticons as known in the art, and select a language for the message session, such as English or Spanish. Other utility buttons for performing other functions can be included in addition to, or instead of, one or more of the utility buttons 212 shown in FIG. 4A.

Edit window 220 shows the message as it is entered by the user. The user can enter and edit the message, using either an input device such as a keyboard, and/or a speech recognition system. When the user is finished entering the message, the send button 222 is selected to send the message to one or more other user(s).

The example of buddy window 204 shown in FIGS. 4A and 4B includes minimize button 226, close button 228, display region 230, utility buttons, such as "skins" button 232, "choices" button 234, "add" button 236, "talk" button 238, a skin-specific button 240, email button 242, user configurable buttons 244-248, and advertising region 250. When a user selects minimize button 226, the display of buddy window 204 changes to a selectable icon, as known in the art.

When the buddy window icon (not shown) is selected, the buddy window 204 is presented to the user. When a user selects close button 228, buddy window 204 is removed from the display. Display region 230 can display a list of other users referred to as "buddies", as shown in FIG. 4A. Button 232 can be used to display a skin manager window 500 (described below in reference to FIG. 5A). Options button 234 allows a user to change various settings. Add button 236 allows the user to add a new person to the list of buddys (shown in display region 230A), and talk button 238 allows a listed buddy to be selected for a messaging session.

Skin-specific button 240 provides information specific to a particular skin, and typically provides a number of categories in a drop-down list box 251, and selection of a category provides access to a number of links to websites in another drop-down list box 252, as illustrated in FIG. 4B. Depending on the skin, the entries in boxes 251 and 252 can be configured to provide only the web addresses of sponsors and/or advertisers. The label on button 240 can be related to the content of the skin being currently displayed, e.g. a skin containing an image of a landmark (such as the Taj Mahal) may be associated with a "travel guide" labeled button 240.

In some embodiments, when a skin changes, the related button 240 also changes, thereby to cause a skin to have not only content (e.g. in the form of a bitmap image), but also functionality (in the form of a button). However, in other embodiments, a user can specify which components of a user's skin to transfer for the message window 202 (FIG. 4A) and the buddy window 204. In one implementation, for example, only the background graphic 206 and the skin-specific links are displayed in the message window 202.

In this same implementation, examples of message window components that do not change when another user's skin is displayed include status bar 210, utility buttons 212, skins button 214, choices button 216, send button 222, and invite button 218. Similarly, examples of some buddy window components that change in this implementation include the background color, button beveling, skin-specific button graphics, skin-specific button menus, and skin-specific buddies. Program elements that do not change in the buddy window 204 in this implementation include the buddy list 230, skins button 232, choices button 234, add button 236, talk button 238, user configurable buttons 244-248, minimize/close buttons 226, 228, and the advertising space 250.

An advertisement displayed in space 250 may be unrelated to the content of the skin in some embodiments, whereas in other embodiments the skin's content is taken into account in targeting advertisements. For example, if the skin contains the image of a landmark, a travel-related advertisement may be displayed (e.g. the icon of American Airlines).

During the skin sharing process, several embodiments of the invention may only change one or more of the following:
1) skin image on message window
2) buddy window background image 3) contents of a skin specific button; and/or 4) image of the skin specific button Therefore, other items that may be displayed to the user remain unchanged in such embodiments. In several embodiments illustrated in FIGS. 2A-2C, during skin sharing only the message window background image changes as well as the message window link and message window link graphic.

Figure 5A:
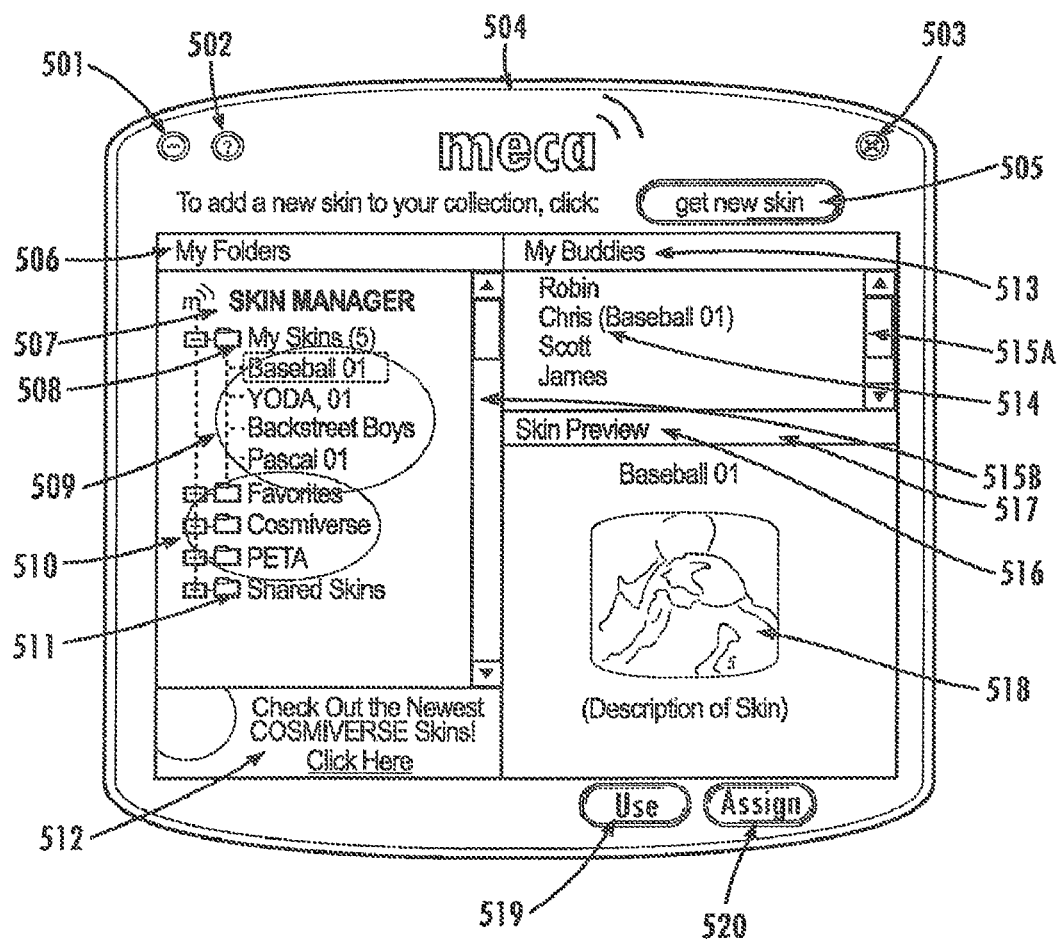

In some embodiments, skinnable software of the type described above in reference to FIGS. 1A-1D makes it easy for a user to change a currently-displayed, skin as illustrated in FIGS. 5A-5G. Specifically, the skinnable software includes a button 232 (described above) that when operated invokes a window 500 containing a "skin manager" 507 (FIG. 5A). Window 500 includes a button 505 to get a new skin, a list 508 that identifies skins previously selected by the user, and another list 511 of skins that have been selected by and shared by other users. To change a currently-displayed skin, the user may select a skin from any of lists 508, 510 and 511.

The various items in window 500 are as follows. Item 501 is the Minimize button which minimizes the Skin Manager window 500 to the task bar. The skin manager is a fixed size form. Item 502 is a Help Button which opens e.g. the URL http://meca.com/Helpjsp. A mouseover message for item 502 reads: "Click here for help." When user glides mouse over this button, the mouseover message is displayed. Item 503 is the Close button—when user clicks on this button, Skin Manager closes. Item 504 is an icon that is a live link to the server's website home page—when user clicks on this graphic, e.g. the URL: http://meca.com opens in a new browser window. A mouseover on this item reads: "May Everyone Connect Always . . . the next generation of Instant Messaging!" which is a message from the operator of server 16.

Item 505 is a Get Skins button—when user clicks on this button, the URL: http://meca.com/Get Skins.jsp opens in a new browser window where user can view the Skin Gallery and download skins. Item 506 is the title Bar for the My Folders pane. This is where the user organizes his/her Skins Collection. A mouseover on item 506 reads: "Right-click to create, delete, or rename folders and skins, or drag and drop to move." Folders open and close with the (+/−). When a folder is open a list of skin names can be seen. The user can drag and drop skins and folders in the directory and also skins within different folders. Parent folders can't be dragged and dropped. And the user cannot delete My Skins Folder or Shared Skins. Also, the user cannot drag or copy skins into the Shared Skins folder.

Item 507 is the Skin Manager where the user organizes the skins in his/her collection. A mouseover on item 507 reads: "Use Skin Manager to organize your Skins Collection". The user may right click on a folder or skin name menu to;

Create New Folder

Delete

Rename

Undo—Undo function for Select All, Cut, Copy, Paste, Rename

Select All

Cut

Copy

Paste

Select Skin

Assign Skin to Buddy

Get New Skins

Item 508 is the My Skins Folder which contains the individual skins the user has added to his collection. User can do the following: i) Create a mouseover that reads: "Skins you have Downloaded", ii) Click on skin to select and iii) Drag and drop onto buddy name in My Buddies to assign skin.

Items 509 are the skins in the user's Skin Collection. Items 510 are User Created Folders. Item 511 is the Shared Skins Folder. This folder automatically stores the skins the user's buddies have used to message him/her. This folder is already created for the user and user cannot delete it. A mouseover on item 511 reads: "Skins your buddies were using while you were messaging with them." The user may click on a skin in item 511 to select it and drag and drop onto buddy name in My Buddies to add the skin.

Item 512 is space (e.g. 180×50 pixels) used for advertisements ("ads") and promotions. The ads in this space are rotated on a schedule. When user clicks in space 512 the URL of the advertiser, opens in a new browser window. Item 513 is the title Bar for a My Buddies pane. This is where the user's Buddy List displays. This folder is already created for the user and user cannot delete it. A mouseover on item 513 reads:

"To assign the preview skin to a specific buddy:

Click the "Assign" button below

Double-click on the buddy name

Drag and drop a skin on the buddy name"

Figure 5B:
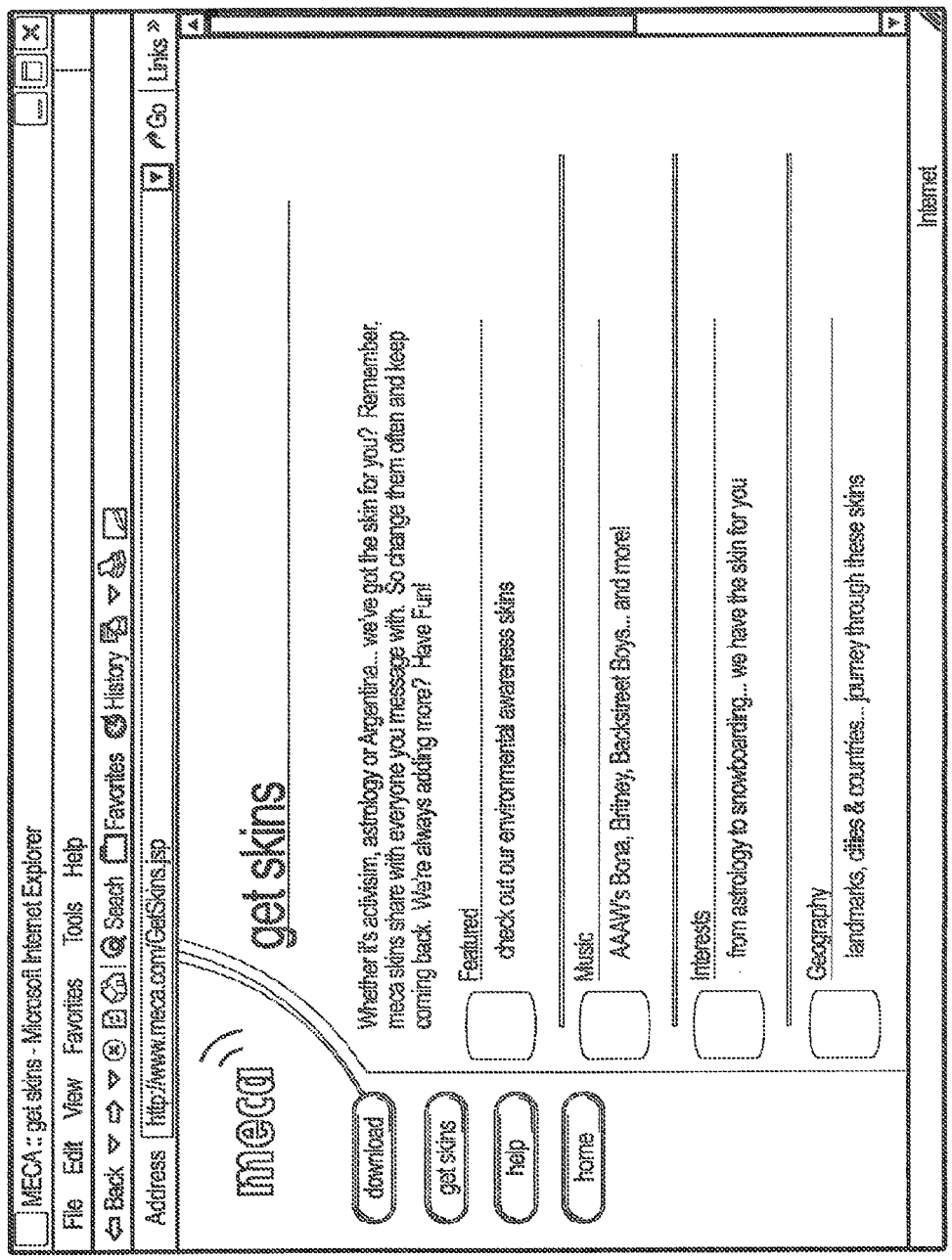

Items 514 are Buddy Names in the user's Buddy List. (This buddy list pulls names from the buddy remote described above.) Items 515A and 515B are vertical Scroll Bars for the My Folders and My Buddies Panes (a horizontal scroll bar may also be present when needed). A bidirectional arrow appears when the user points the mouse cursor on the edge between the left and the right windows. Item 516 is the title bar for the Skin Preview pane. This pane displays the title, picture, and description of the highlighted skin in the Skin Folder pane. A mouseover reads: "This previews the selected skin from My Folders." Item 517 indicates that the Skin Preview pane is resizable (vertically). Item 518 is the currently previewed skin, which is highlighted from My Folders. Item 519 is the Use Skin button which changes the To get a new skin that is not displayed in any of lists 508, 510 and 511, the user operates button 505 that launches a browser which is directed to a predetermined website, as illustrated in FIG. 5B. At the website, the user has access to a set of skins, and the user may select a skin 294 (FIG. 5C) which results in the skin being downloaded (FIG. 5D). The download may take a few seconds, depending on the size of the file being downloaded and the speed of the connection. Thereafter, the new skin (e.g. Argentina 01) is shown in the list 292 (FIG. 5E), in the skin manager window 290. The user may then select the newly-downloaded skin 294, and on doing so, a thumbnail 295 is displayed. On operating the "Ok" button 296 in the window 290, the skinnable software (e.g. windows 202 and 204 described above in reference to FIG. 4A) is updated to display the new skin (e.g. a graphic image called "Argentina 01" shown as thumbnail 294 in FIG. 5C).

Figure 6H:
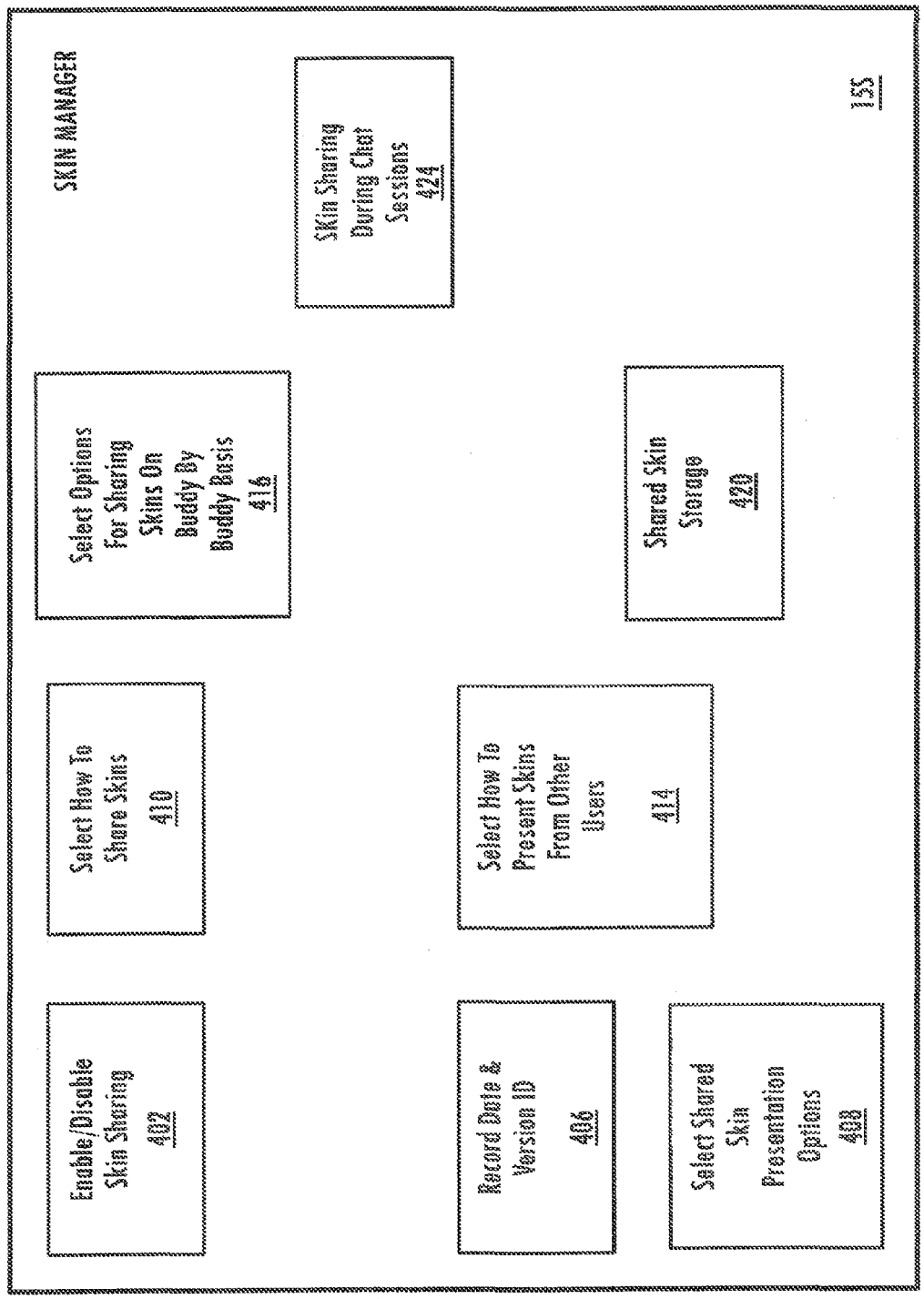
FIG. 6A illustrates examples of skin manager modules for skin sharing in accordance with the present invention.
FIGS. 6B and 6C illustrate a window for customizing the display of skins in accordance with the invention.
Figure 6C:
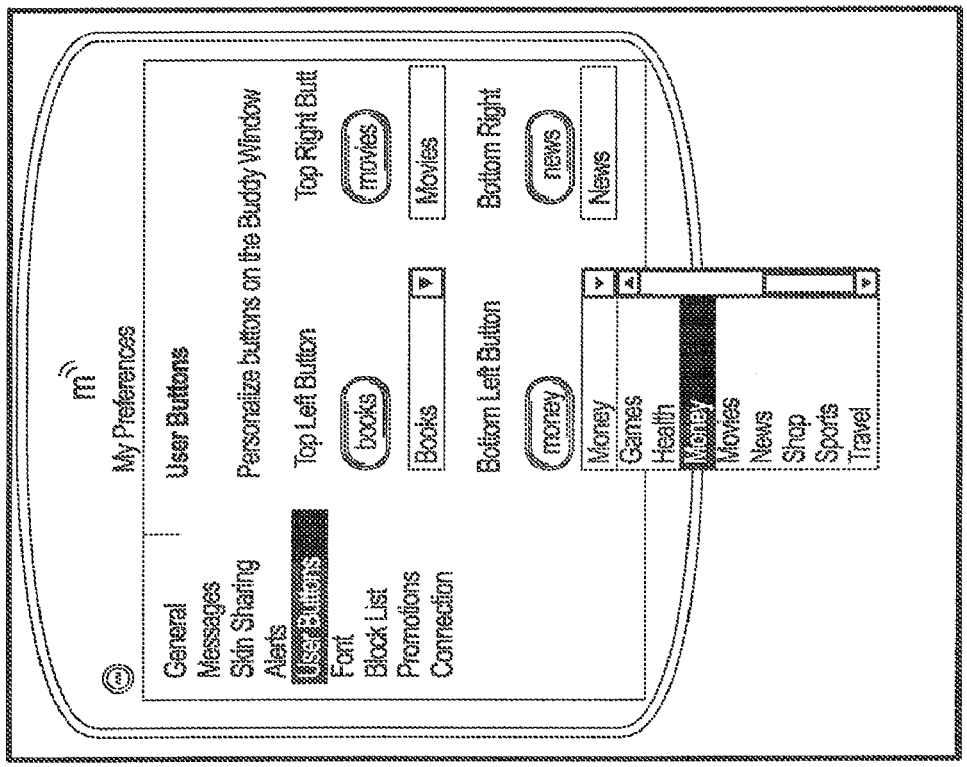

Referring now to FIG. 6A, an example of a set of modules for performing functions associated with skin manager 302 is shown. Note that the functions performed by skin manager 302 can be arranged in a variety of ways, and the arrangement shown in FIG. 6A is merely one way to group the functions. Presentation and selection of options available in a module can also be implemented in a variety of ways in the user interface for the instant messenger, including pull-down menus, icons, and other ways known in the art.

Figure 6B:
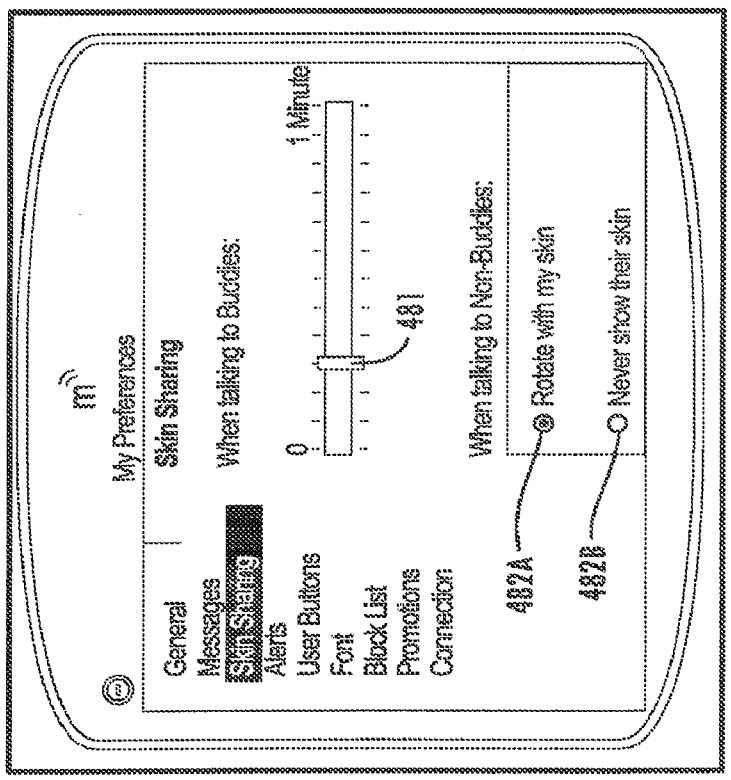

"Select Shared Skin Presentation Options" module 408 allows the user to control the amount of time required to fade a skin in and out of presentation to the user as illustrated by a slider 481 (FIG. 6B). A variety of options can be implemented including an option to always present the other user's skin, to never present the other user's skin (as per radio buttons 482A and 482B), to alternate presentation between two or more skins, to specify the number of times to alternate presentation of the skins, and to specify the length of time between alternating presentations of skins (as per sliding-switch button 481).

"Enable/Disable Skin Sharing" module 402 (FIG. 6A) allows a user to enable or disable skin sharing as per radio buttons 482A and 482B. When a user enables skin sharing, skins from one or more other users are transferred to the user's workstation and presented to the user. The transfer can occur under several conditions including upon establishing an instant messaging or chat session. Other modules, as discussed herein are included in skin manager 302 that allow the user to enable or disable skin sharing on a buddy-by-buddy basis.

Specifically, "Select Options for Sharing Skins On Buddy By Buddy Basis" module 416 (FIG. 6A) allows the user to control the skins that are used with different buddies. For example, a two pane window is used by module 416 to display in one pane a list of users referred to as "buddies" and in another pane a list of skins. The two panes can be arranged either horizontally or vertically relative to one another. The user may highlight one or more buddies in one pane and highlight one or more skins in another pane and thereafter click on a button which is marked "allow sharing." On such clicking, the selected skins are made available for sharing with the selected buddies.

Note that the share per buddy feature just described in the previous paragraph is an optional feature that may or may not be implemented depending on the embodiment. Moreover, as noted above, in some embodiments, a skin that is currently displayed to the user is the skin that is shared, and is displayed only if that displayed skin is in the list of skins that have been preapproved by the user (i.e. marked as being allowed for sharing). In other embodiments, no preapproval is required, while in still other embodiments this feature is not even available.

Also, "Select How to Present Skins From Other Users" module 414 (FIG. 6A) allows the user to control the display of other user's skins. For example, a two pane window is used by module 414 to display in one pane a list of users referred to as "buddies" and in another pane a list of transition effects. In this window, the user is also allowed to select the duration of the transition effect. The user may highlight one or more buddies in one pane and highlight one or more transition effects in another pane and thereafter click on a button which is marked "select presentation technique."

On such clicking, the selected transition effects are used (at random if multiple effects are selected) when displaying skins from the selected buddies.

"Select How To Share Skins" module 410 (FIG. 6A) allows the user to select whether all or none of the skins belonging to the user can be shared, or whether certain types of skins can be shared. A user can select a type for each skin using the "Designate User's Skin Types" module 412. For example, the user can designate each of his or her own skins as public or private. Other categories or types can be implemented in addition to, or instead of, the public/private designation. The interface to this feature can be made available through use of the "skins" button 232 (FIG. 5A).

A user can select a type for each skin using the "Designate User's Skin Types" module 412. For example, the user can designate each of his or her own skins as public or private. Other categories or types can be implemented in addition to, or instead of, the public/private designation. The interface to this feature can be made available through use of the "skins" button 232.

"Record Date and Version ID" module 406 stores the date of transfer and the version ID in workstation 15A when a skin is transferred to workstation 15A from another source, such as another workstation 15B or server 16 (FIG. 1B). This information is used in conjunction with the request skin version message (FIG. 3A) to determine whether the latest version of a skin has been transferred. The date of transfer and version ID is updated when a newer version is transferred.

Referring again to FIG. 6A, when a new skin, or a new version of a skin, is transferred to workstation 15A, "Shared Skin Storage" module 420 stores the skin on workstation 15A. This allows skin manager 302 to access the skin faster for subsequent presentations, compared to transferring it again from server 16 or another workstation 15A.

Those skilled in the art will appreciate that software program instructions are capable of being distributed as a program product in a variety of forms, and that the present invention applies equally regardless of the particular type of signal bearing media used to actually carry out the distribution. Examples of signal bearing media include recordable type media such as floppy disks and CD-ROM, enhanced CD (audio) as well as DVD-ROMS, transmission type media such as digital and analog communications links, as well as other media storage and distribution systems.

Additionally, the foregoing detailed description has set forth various embodiments of the present invention via the use of block diagrams, flowcharts, and examples. It will be understood by those within the art that each block diagram component, flowchart step, and operations and/or components illustrated by the use of examples can be implemented, individually and/or collectively, by a wide range of hardware, software, firmware, or any combination thereof.

In one embodiment, the present invention may be implemented via Application Specific Integrated Circuits (ASICs). However, those skilled in the art will recognize that the embodiments disclosed herein, in whole or in part, can be equivalently implemented in standard Integrated Circuits, as a computer program running on a computer, as firmware, or as virtually any combination thereof and that designing the circuitry and/or writing the code for the software or firmware would be well within the skill of one of ordinary skill in the art in light of this disclosure.

Various communication links can be utilized in computer network 20 (FIG. 1B), such as a dial-up wired connection with a modem, a direct link such as a T1, ISDN, or cable line, a wireless connection through a cellular or satellite network, or a local data transport system such as Ethernet or token ring over a local area network.

An "On Demand Skin Sharing Options" module may be used in some embodiments to handle requests for a skin from a user. Such a skin manager (not shown) determines whether the latest version of the requested skin is currently stored in the user's workstation. When the requested skin is not currently stored in the workstation, the skin manager determines whether the requested skin can be transferred directly from another workstation, such as when peer-to-peer network is utilized and direct transfers of skins is authorized by the user from whom the skin is requested. The skin manager obtains a skin in this manner, when a direct transfer is possible. If a direct transfer is not possible, the skin manager transfers the requested skin via a server.

Those skilled in the art will appreciate that workstations 15A and 15B (also called "clients") can be one of a variety of stationary and/or portable devices that are capable of receiving input from a user and transmitting data to the user. The devices can include visual display, audio output, tactile input capability, and/or audio input/output capability. Such devices can include, for example, desktop, notebook, laptop, and palmtop devices, television set-top boxes and interactive or web-enabled televisions, telephones, and other stationary or portable devices that include information processing, storage, and networking components. Additionally, each workstation 15A and 15B can be one of many workstations (not shown) connected to network 120 as well as to other types of networks such as a local area network (LAN), a wide area network (WAN), or other information network.

A server 16 (FIG. 1B) if present, may be implemented on one or more computer systems, as are known in the art and commercially available. Such computer systems can provide load balancing, task management, and backup capacity in the event of failure of one or more computer systems in server 16 to improve the availability of server 16. Server 16 can also be implemented on a distributed network of storage and processor units, as known in the art, wherein the modules and databases associated with the present invention reside on workstations 15A and 15B, thereby eliminating the need for server 16.

Therefore, several embodiments of the type described herein provide a system for sharing the customized user interfaces between users who are communicating with one another, thereby allowing another level of communication to occur between users. Specifically, such systems automatically transfer and present the customized user interfaces of users engaged in the same instant messaging or chat session.

While the invention has been described with respect to the embodiments, examples, illustrations and variations set forth above, these descriptions are illustrative and the invention is not to be considered limited in scope to the described embodiments, examples, illustrations and variations. Numerous such modifications, improvements, and variations of the embodiments, illustrations and examples of the type described herein will be apparent to the skilled artisan in view of this disclosure.

For example, a single client computer (and a single user) may have any number of skinnable programs (such as an instant messenger, e-mail client, a browser, or any prior art program of the type described above in the section "BACKGROUND OF THE INVENTION"), and a given skin may be displayed by any one or more of these programs. Therefore, one user's skins can be exchanged with another user (regardless of which skinnable program the two users are using at any given moment).

In certain embodiments, if a user changes a skin after commencement of skin sharing, the skin sharing session completes based on skins that were present at the beginning of skin sharing, and the changed skin is not shared until the next session. In other embodiments, the changed skin is immediately shared during a current skin sharing session (if the skin sharing session lasts long enough for the new skin to be downloaded in the background from the server).

In certain embodiments, a workstation 15A (also called client) may send to a server 16 a request to download a skin. To send the request, the client needs to know the skin ID which is obtained from a servlet GetCustomerSkins executing on server 16 in either of the following ways in order: (1) the client sends a parameter called 'sourceID' (parameter is case sensitive) for a certain user; the servlet GetCustomerSkins returns the 'skinid(s)' for this 'sourceID'; and (2) If the parameter 'sourceID' wasn't sent then the client should send the parameters 'username' and the 'password' (both case sensitive), the GetCustomerSkins servlet will authenticate this user to, then get the sourceID for this user, the GetCustomerSkins servlet then will return the 'skinid(s)' for this 'sourceID'.

Errors that may be returned to the client while using the GetCustomerSkins servlet are:

| Error code | Error |
| --- | --- |
| NACK,1 | Internal Server Error (db error, . . .) |
| NACK,2 | Authentication Error: Username wasn't sent Password wasn't sent Username, password Auth error |
| NACK,3 | No Skins: EXAUSTED_RESULT_SET_ERROR |

The client also may ask for a skin to be downloaded by calling the GetSkinViaStream servlet: the client sends the parameter 'skin' (case sensitive represent the skinid) to the server; the server returns a binary stream represent the skin file.

The following table which is an integral part of this detailed description, sets forth certain acts performed in one specific embodiment which is illustrated in FIG. 3B.

TABLE 1

| Act | Function | Server Code | Client Code | Description |
| --- | --- | --- | --- | --- |
| 101 | Initiate Message | | Client2.txt (Line 2 to line 23) | User opens message window - by double click the buddy in the buddy list, or Click the talk button (This is the source side) |
| 102 | Open conversation form | | Client2.txt (Line 26 to line 122) | Client creates the conversation form on the source side |
| 103 | Load current skin | | Client1.txt (Line 124 to line 234) | Client looks for the current skin ID used by the source, and loads it from the skins folder |
| 104 | Is there an updated version of the current skin? | | Client2.txt (Line124 to line 226) | Client checks if the current skin is updated on the server or not |
| 105 | The latest skin is downloaded from the server | | Client2.txt (Line228 to line 441) | If there is an updated version of the current skin on the server, the latest skin is downloaded from the server |
| 106 | Message window is displayed with the current skin | | Client1.txt (Line 221 to line 231) | The skin in the skins folder is displayed on the message window |

TABLE 1-continued

| Act | Function | Server Code | Client Code | Description |
|---|---|---|---|---|
| 107 | Is there a fade value for the message window? | | Client1.txt (Line 1142 to line 1178) | Client checks if there is any fade value specified for the message window |
| 108 | The fade value is set to the default | | Client1.txt (Line 1142 to line 1178) | If there is no specified fade value, the default value is set as the current fade value |
| 109 | Message window is faded | | Client1.txt (Line 1180 to line 1197) | The message window is faded according to the fade value |
| 110 | Send message to the target | | Client1.txt (Line 408 to line 461) | Source enters text in the typing window of the message window |
| 111 | Check if the user is online | | Client1.txt (Line 408 to line 461) | Client checks if the target user is online now or not |
| 112 | Message is sent to the target user | | Client1.txt (Line 408 to line 461) | If the target user online now, the source message is sent to the server to be sent to the target |
| 113 | Server receives the source message | server1.txt (line 6 to line 23) | | The source message is received by the server. |
| 114 | Read the source skin ID | server1.txt (line 32 to line 108) | | Server reads the current skin ID of the source user |
| 115 | Source message is sent to the target | server1.txt (line 32 to line 108) | | Server sends the source message to the target with the source user and skin ID |
| 116 | Target message window is opened | | Chent2.txt (Line 26 to line 122) | The message window is opened on the target side if the source user is a buddy or by selecting the Accept if Non Buddy |
| 117 | Load current skin | | Client1.txt (Line 124 to line 234) | Client looks for the current skin ID used by the target, and loads it from the skins folder |
| 118 | Is there an updated version of the current skin? | | Client2.txt (Line124 to line 226) | Client checks if the current skin is updated on the server or not |
| 119 | The latest skin is downloaded form the server | | Client2.txt (Line228 to line 441) | If there is an updated version of the current skin on the server, the latest skin is downloaded from the server |
| 120 | Message window is displayed with the current skin | | Client1.txt (Line 221 to line 231) | The skin in the skins folder is displayed on the message window |
| 121 | Is there a fade value for the message window? | | Client1.txt (Line 1142 to line 1178) | Client checks if there is any fade value specified for the message window |
| 122 | The fade value is set to the default | | Client1.txt (Line 1142 to line 1178) | If there is no specified fade value, the default value is set as the current fade value |
| 123 | Message window is faded | | Client1.txt (Line 1180 to line 1197) | The message window is faded according to the fade value |
| 124 | Message is displayed on the target side with the source name | | Client1.txt (Line 1 to line 190) | the message is displayed on the target side on the message window with the source name |
| 125 | Target replay to the source ? | | | if the target replay to the source by a message or not ? |
| 126 | Session is closed with no skin sharing applied | | | if the target didn't send a message to the source there will be no skin sharing |
| 127 | Target message is sent to the server | | Client1.txt (Line 408 to line 461) | if the target sends a message to the source the message will be sent to the server |
| 128 | Server send the message with target skin ID to the source | server1.txt (line 32 to line 108) | | Server sends the target message to the source, with the target user and skin ID |
| 129 | Sharing time = 0? | | Client1.txt (Line 1199 to line 1216) | check if the sharing time specified for the target is equal to zero or not |

TABLE 1-continued

| Act | Function | Server Code | Client Code | Description |
|---|---|---|---|---|
| 130 | Time - Target sharing time? | | Client1.txt (Line 1199 to line 1216) | if the sharing time is not equal to zero then set the time variable to be equal to sharing time |
| 131 | skin = source skin | | | set the skin variable to be equal to the source skin |
| 132 | time = time − 1 | | Client1.txt (Line 236 to line 243) | decrement the time variable by one each time |
| 133 | time = 0 ? | | Client1.txt (Line 236 to line 243) | check if the time variable is equal to zero or not ? |
| 134 | Check skin ? | | Client1.txt (Line 391 to line 404) | check if this skin had been checked for updating and existing in the skins folder |
| 135 | Skin in target skins folder ? | | Client1.txt (Line 376 to line 389) | check if the source skin is in the target skin folder or not |
| 136 | Download from the server | | Client2.txt (Line228 to line 441) | If the skin is not on the target skin folder the latest skin is downloaded from the server |
| 137 | update skin | | Client2.txt (Line124 to line 226) | Client checks if the current skin is updated on the server or not |
| 138 | download the latest from the server | | Client2.txt (Line228 to line 441) | If there is an updated version of the current skin on the server, the latest skin is downloaded from the server |
| 139 | Skin is displayed on the target side | | Client1.txt (Line 221 to line 231) | The skin in the skins folder is displayed on the message window |
| 140 | Time = Time + 1 | | Client1.txt (Line 236 to line 243) | increment the time variable by one each time |
| 141 | Time = Target sharing time? | | Client1.txt (Line 236 to line 243) | check if the time variable is equal to the target sharing time or not ? |
| 142 | Skin = target skin | | | set the skin variable to be equal to the target, skin if the previous skin was the source skin else the skin equal to the source |

Various embodiments and modifications and improvements of the examples, embodiments, and illustrations described herein are encompassed by the attached claims.

What is claimed is:

1. A method for sharing skins between a first user and a second user via a computer network, the method, comprising:
transferring a first skin associated with the first user to the second user, wherein the first skin comprises at least a graphical representation of an application;
displaying the first skin to the second user;
wherein at least one of said transferring and said displaying is performed automatically;
receiving, from a second work station associated with the second user, a second skin at a first work station associated with the first user; and
displaying, through the first work station, the second skin such that the first work station transitions from displaying the first skin to displaying the second skin;
wherein the transition from displaying the first skin to displaying the second skin comprises transitioning as controlled in accordance with a user selected transition effect as selected by the first user.

2. The method, as set forth in claim 1, further comprising: acquiring an identity of the first skin.

3. The method, as set forth in claim 1, further comprising: transferring, from the second workstation associated with the second user, the second skin to the first work station associated with the first user.

4. The method, as set forth in claim 1, wherein the first workstation associated with the first user transfers the first skin to the second workstation associated with the second user, wherein the displaying the first skin to the second user comprises displaying through the second workstation the first skin to the second user.

5. The method, as set forth in claim 1, further comprising: determining a method for transferring the first skin.

6. The method, as set forth in claim 5, wherein determining a method for transferring the first skin comprises:
determining whether the first skin is currently stored in the second workstation associated with the second user.

7. The method, as set forth in claim 5, wherein determining a method for transferring the first skin comprises: accessing the first skin via a skin sharing server.

8. The method, as set forth in claim 5, wherein determining a method for transferring the first skin comprises:
determining whether the first skin is currently stored in the second workstation; and
transferring the first skin via a skin sharing server.

9. The method, as set forth in claim 1, further comprising:
establishing a messaging session between the first user and the second user; and
alternately displaying the first skin and the second skin associated with the second user to the first user.

10. The method, as set forth in claim 1, further comprising:
establishing a messaging session between the first user and the second user; and alternately displaying the first skin and the second skin associated with the second user to the second user.

11. The method, as set forth in claim 1, further comprising:
establishing a messaging session between the first user and the second user;
alternately displaying the first skin and the second skin associated with the second user to the first user when the first user has authorized skin sharing; and
alternately displaying the first skin and the second skin associated with the second user to the second user when the second user has authorized skin sharing.

12. The method, as set forth in claim 1, further comprising:
receiving selections of options to control how often the shared skins are displayed.

13. The method, as set forth in claim 1, further comprising:
receiving selections of options to control whether the first user can download a skin from a skin sharing server.

14. The method, as set forth in claim 1, further comprising:
displaying options to control how often the shared skins are displayed.

15. The method, as set forth in claim 1, further comprising:
recording the display date and at least a portion of an identity of a skin that is shared between the first and second users.

16. The method, as set forth in claim 1, further comprising:
storing the first skin on the second workstation associated with the second user.

17. The method, as set forth in claim 1, further comprising:
displaying the first skin simultaneously with one or more options for controlling skin sharing between the first and second users.

18. The method, as set forth in claim 1, further comprising:
transferring the first skin, after the first user sends a message to the second user; and
displaying the first skin to the one or more other users.

19. The method, as set forth in claim 1, wherein the transferring the first skin is performed automatically.

20. The method, as set forth in claim 1, wherein the displaying the first skin is performed automatically.

21. The method, as set forth in claim 1, wherein the transferring and displaying the first skin is performed automatically.

22. The method, as set forth in claim 1, wherein a default skin is associated with the first user, further comprising:
transferring the default skin unless the first user turns off a skin sharing option not allowing access to the default skin.

23. The method, as set forth in claim 1, wherein transferring the first skin includes:
retrieving the first skin from cache memory in the second workstation associated with the second user when the first skin is the same as the second skin.

24. The method, as set forth in claim 1, wherein the transferring the first skin includes:
retrieving the first skin from cache memory in the second workstation when the first skin is alternately displayed with the second skin.

25. A computer readable storage media comprising:
computer instructions that induce a physical device implementing the computer instructions to implement the method of claim 1.

26. The method, as set forth in claim 1, wherein the transfer of the second skin is in response to an inter-party communication comprising an instant messaging communication.

27. A method for sharing a first skin associated with a first user and a second skin associated with a second user via a computer network, the method comprising:
receiving the first skin at a second display device associated with the second user, wherein the first skin comprises at least a graphical representation of an application; and
alternately displaying the first skin and the second skin to the second user; and
transferring, from the second display device, the second skin to a first display device associated with the first user;
wherein the alternately displaying comprises transitioning from displaying, through the second display device, the first skin to displaying the second skin; and
wherein the transitioning from displaying the second skin to displaying the first skin comprises transitioning as controlled in accordance with a user selected transition effect as selected in accordance with the second user.

28. The method, as set forth in claim 27, wherein alternately displaying comprises:
displaying the first skin to the second user in place of the second skin; and
displaying the second skin to the second user in place of the first skin.

29. A method for sharing a first skin associated with a first user and a second skin associated with a second user via a computer network, wherein the first skin comprises at least a graphical representation of an application, the method comprising:
automatically transferring the first skin to the second user;
automatically displaying the first skin to the second user, in place of the second;
receiving, from a second display device, associated with the second user, the second skin at a first display device associated with the first user; and
displaying, through the first display device, the second skin such that the first display device transitions from displaying the first skin to displaying the second skin;
wherein the transition from displaying the first skin to displaying the second skin comprises transitioning as controlled in accordance with a user selected transition effect as selected by the first user.

30. The method, as set forth in claim 29, further comprising:
automatically transferring the second skin to the first user; and
automatically displaying the second skin to the first user, in place of the first skin.

31. A method for sharing a first skin associated with a first user and a second skin associated with a second user via a computer network, wherein the first skin comprises at least a graphical representation of an application, the method comprising:
causing to be displayed, at a second display device associated with the second user, the first skin to the second user;
receiving, from the second display device, the second skin at a first display device; and
displaying, through the first display device associated with the first user, the second skin to the first user;
wherein the displaying the second skin at the first display device comprises transitioning from displaying the first skin to displaying the second skin; and
wherein the transitioning from displaying the first skin to displaying the second skin comprises transitioning as controlled in accordance with a user selected transition effect as selected by the first user.

32. The method, as set forth in claim 31 further comprising:
displaying the first skin to the first user in place of the second skin; and
displaying the second skin to the second user in place of the first skin.

33. The method, as set forth in claim 32 further comprising:
periodically repeating the acts of displaying.

34. A method for sharing a first skin associated with a first user and a second skin associated with a second user via a server, wherein the first skin comprises at least a graphical representation of an application, the method comprising:
transferring the first skin to the second user;
transferring the second skin to a first display device associated with the first user where the second skin is displayed, through the first display device, by transitioning from displaying the first skin to displaying the second skin;
wherein the transitioning from displaying the first skin to displaying the second skin comprises transitioning as controlled in accordance with a user selected transition effect as designated by the first user; and
storing an indication of transfer of the first skin to the second user and vice versa.

35. The method, as set forth in claim 34 further comprising:
statistically reporting on the transfers.

36. An apparatus comprising a computer programmed to:
transfer a first skin to a first user, wherein the first skin comprises at least a graphical representation of an application;
transfer a second skin to a second user;
transfer the first skin to the second user; and
transfer the second skin to a first display device associated with the first user where the second skin is displayed, through she first display device, by transitioning from displaying the first skin to displaying the second skin;
wherein the transitioning from displaying the first skin to displaying the second skin comprises transitioning as controlled in accordance with a user selected transition effect as designated by the first user.

37. The apparatus, as set forth in claim 36 wherein the computer comprises a database for holding statistics on the transfers and the computer is further programmed to:
report on the transfers in response to a query.

* * * * *

UNITED STATES PATENT AND TRADEMARK OFFICE
CERTIFICATE OF CORRECTION

PATENT NO. : 7,610,352 B2  
APPLICATION NO. : 10/238389  
DATED : October 27, 2009  
INVENTOR(S) : AlHusseini et al.

It is certified that error appears in the above-identified patent and that said Letters Patent is hereby corrected as shown below:

Claim 18, column 23, line 35, after "to" delete "the".  
Claim 29, column 24, line 32, delete "device," and insert --device--.

Signed and Sealed this

Fifth Day of January, 2010

David J. Kappos  
*Director of the United States Patent and Trademark Office*